United States Patent
Flynn, IV et al.

(10) Patent No.: US 10,999,380 B2
(45) Date of Patent: May 4, 2021

(54) METHOD AND APPARATUS OF INTERWORKING M2M AND IOT DEVICES AND APPLICATIONS WITH DIFFERENT SERVICE LAYERS

(71) Applicant: Convida Wireless, LLC, Wilmington, DE (US)

(72) Inventors: William Robert Flynn, IV, Schwenksville, PA (US); Dale N. Seed, Allentown, PA (US); Paul L. Russell, Jr., Pennington, NJ (US); Michael F. Starsinic, Newtown, PA (US); Guang Lu, Thornhill (CA); Quang Ly, North Wales, PA (US); Qing Li, Princeton Junction, NJ (US); Shamim Akbar Rahman, Cote St. Luc (CA); Phillip Brown, Los Angeles, CA (US); Zhuo Chen, Claymont, DE (US); Xu Li, Plainsboro, NJ (US); Vinod Kumar Choyi, Conshohocken, PA (US); Lijun Dong, San Diego, CA (US); Catalina M. Mladin, Hatboro, PA (US); Chonggang Wang, Princeton, NJ (US); Hongkun Li, Malvern, PA (US)

(73) Assignee: Convida Wireless, LLC, Wilmington, DE (US)

(*) Notice: Subject to any disclaimer, the term of this patent is extended or adjusted under 35 U.S.C. 154(b) by 272 days.

(21) Appl. No.: 15/579,711

(22) PCT Filed: Jun. 3, 2016

(86) PCT No.: PCT/US2016/035738
§ 371 (c)(1),
(2) Date: Dec. 5, 2017

(87) PCT Pub. No.: WO2016/196947
PCT Pub. Date: Dec. 8, 2016

(65) Prior Publication Data
US 2018/0183882 A1    Jun. 28, 2018

Related U.S. Application Data

(60) Provisional application No. 62/171,652, filed on Jun. 5, 2015.

(51) Int. Cl.
*H04L 29/08* (2006.01)
*H04W 4/70* (2018.01)
(Continued)

(52) U.S. Cl.
CPC .............. *H04L 67/16* (2013.01); *H04L 67/34* (2013.01); *H04L 69/321* (2013.01); *H04W 4/50* (2018.02); *H04W 4/70* (2018.02); *H04L 69/40* (2013.01)

(58) Field of Classification Search
None
See application file for complete search history.

(56) References Cited

U.S. PATENT DOCUMENTS

| 8,171,468 B2 * | 5/2012 | Larsson | H04M 1/72525 |
| | | | 717/173 |
| 2011/0191456 A1 * | 8/2011 | Jain | H04L 67/16 |
| | | | 709/223 |

(Continued)

FOREIGN PATENT DOCUMENTS

| WO | 2005/062642 A1 | 7/2005 |
| WO | 2011/095993 A1 | 8/2011 |

(Continued)

OTHER PUBLICATIONS

RFC 6763, DNS-Based Service Discovery, Feb. 2013, 49 pages.
(Continued)

*Primary Examiner* — Natisha D Cox
(74) *Attorney, Agent, or Firm* — BakerHostetler

(57) ABSTRACT

Methods and procedures allow devices interwork with various types of service layers by updating the device to support the protocol of the M2M/IoT service layer that is being communicated with. Devices can coordinate/initiate down- (Continued)

load of a service layer API that is compatible with the service layer the device is attempting to use. A service layer can coordinate the autonomous update of a device with the proper service layer API which allows the device to then communicate and use services supported by the service layer component to the device. A service layer can detect a device or application lacking proper service layer functionality and can trigger a management entity to update the device or application with the service layer API required such that the device can then register to the service layer and use its services. A device or application can be customized or optimized to the service layer that it is registered to and using.

11 Claims, 30 Drawing Sheets

(51) Int. Cl.
*H04W 4/50* (2018.01)
*H04L 29/14* (2006.01)

(56) References Cited

U.S. PATENT DOCUMENTS

| | | | |
|---|---|---|---|
| 2013/0212236 A1* | 8/2013 | Foti | H04W 4/70 709/221 |
| 2014/0126581 A1* | 5/2014 | Wang | H04W 4/70 370/431 |
| 2016/0094502 A1* | 3/2016 | Pollack | H04L 51/12 726/4 |
| 2016/0135241 A1* | 5/2016 | Gujral | H04W 4/70 370/328 |
| 2016/0344841 A1* | 11/2016 | Wang | H04W 4/70 |
| 2017/0012815 A1* | 1/2017 | Nekrestyanov | H04L 67/02 |
| 2017/0337088 A1* | 11/2017 | Wang | G06F 9/541 |
| 2018/0255175 A1* | 9/2018 | Tran | H04W 8/00 |

FOREIGN PATENT DOCUMENTS

| | | |
|---|---|---|
| WO | 2011/112683 A1 | 9/2011 |
| WO | 2014/182674 A1 | 11/2014 |

OTHER PUBLICATIONS

OneM2M Technical Specification, OneM2M TS-0006-V0-1-0, Management Enablement (BBF), Mar. 2014, 17 pages.
OneM2M Technical Specification, OneM2M TS-0005-V1.0.1, Management Enablement (OMA), Jan. 2015, 60 pages.
OneM2M Service Layer Core Protocol Specification, OneM2M TS-0004-V1-0-1, Jan. 2015, 217 pages.
OneM2M Service Component Architecture, OneM2M TS-0007-V0-2-0, May 2014, 47 pages.
OneM2M Functional Architecture, OneM2M TS-0001-V1.6.1, Jan. 2015, 321 pages.
OMA Management Interface to M2M Requirements, Draft Version 1.0, Jan. 2014, 19 pages.
OMA Lightweight Machine to Machine Technical Specification, Version 1.0, Feb. 2017, 138 pages.
OMA Gateway Management Object Technical Specification, Version 1.0, Jun. 2013, 80 pages.
OMA Device Management Standardized Objects, Version 1.3, Oct. 2012, 31 pages.
OMA Device Management Protocol, Version 1.3, May 2016, 60 pages.
ITU-T, "M2M Service Layer: Requirements and Architectural Framework", Apr. 30, 2014, 15 pages.
ETSI TS 102 690_Machine to Machine Communications (M2M) Functional Architecture, V2.0.14, Jul. 2013, 332 pages.
ETSI 102 921_Machine to Machine Communications (M2M) mla, dla and mild Interfaces, V1.1.1, Feb. 2012, 538 pages.
BBF TR-069 CPE WAN Management Protocol, Version 1.4, Mar. 2018, 276 pages.

* cited by examiner

METHOD AND APPARATUS OF INTERWORKING M2M AND IOT DEVICES AND APPLICATIONS WITH DIFFERENT SERVICE LAYERS

CROSS-REFERENCE TO RELATED APPLICATIONS

This Application is a National Stage Application filed under 35 U.S.C. § 371 of International Application No. PCT/US2016/035738 filed Jun. 3, 2016, which claims benefit of U.S. Provisional Patent Application Ser. No. 62/171,652, filed Jun. 5, 2015, the disclosure of which is hereby incorporated by reference as if set forth in its entirety.

BACKGROUND

From a protocol stack perspective, a service layer 102 is typically situated above the application protocol layer 104 and provides value added services to applications 106 or to another service layer. Hence a service layer 102 is often categorized as a "middleware" service. A Machine-to-Machine (M2M)/Internet-of-Things (IoT) service layer is targeted towards M2M/IoT devices and applications.

An example deployment of an M2M/IoT service layer, instantiated within a network, is shown in FIG. 2. In this example, a service layer instance 202 is a realization of a service layer. A number of service layer instances, such as service layer instance 202, are deployed on various network nodes (i.e., gateways and servers) for providing value-added services to network applications, device applications, and the network nodes themselves. Recently, several industry standard bodies (e.g., oneM2M) have been developing M2M/IoT service layers to address the challenges associated with integration of M2M/IoT types of devices and applications into network deployments such as the Internet, cellular, enterprise, and home. An M2M service layer can provide applications and devices access to a collection of M2M-oriented capabilities supported by the service layer. A few examples of such capabilities include security, charging, data management, device management, discovery, provisioning, and connectivity management. These capabilities are made available to applications via Application Program Interfaces (APIs) which make use of message formats, resource structures and resource representations defined by the M2M service layer.

The goal of oneM2M is to develop technical specifications which address the need for a common service layer that can be readily embedded within hardware apparatus and software modules to support a wide variety of devices in the field with M2M application servers worldwide. The oneM2M common service layer supports a set of Common Service Functions (CSFs) (i.e. service capabilities), as shown in FIG. 3. An instantiation of a set of one or more particular types of CSFs is referred to as a Common Services Entity (CSE) 302 which can be hosted on different types of network nodes (e.g. Infrastructure Node, Middle Node, and Application-Specific Node. CSEs are termed IN-CSE, MN-CSE and ASN-CSE respectively).

Initially, oneM2M is developing a service layer compliant with RESTful architectural principles that acts upon defined resources (as shown in FIG. 4). A resource is a uniquely addressable element in the architecture having a representation that can be manipulated via RESTful methods such as Create, Retrieve, Update, and Delete. These resources are made addressable using a Universal Resource Identifiers (URIs). A resource may contain child resource(s) and attribute(s). A child-resource is a resource that has a containment relationship with a parent resource. The parent resource representation contains references to its child resources(s). The lifetime of a child-resource is limited by the parent's resource lifetime. Each resource supports a set of "attributes" that store information of the resource.

Recently, the M2M Service Component Architecture (as shown in FIG. 5) is being developed to consider legacy deployments that are not RESTful based, and which are primarily suitable for the infrastructure domain where the CSE is viewed as a set of service components. It largely re-uses the existing service layer architecture shown in FIG. 4, but within the service layer various M2M services can be grouped into service components. In addition to existing reference points, it introduces the inter-service reference point Msc 502. Communication between M2M Service Components passing over the Msc reference point 502 utilizes a web service approach, which is the most popular technology for building Service-Oriented Architecture (SoA)-based software systems.

The following briefly describes some of the M2M/IoT interworking approaches that already exist in specifications or development. 'Interworking' refers to the ability for M2M devices designed to communicate via a particular service layer or protocol to communicate with another service layer that uses different messaging or protocols. The following focuses on communications between M2M/IoT devices/applications with M2M/IoT service layers. Some of the procedures can also be applied to M2M/IoT service layer to service layer communications.

The oneM2M architecture solution to interworking with non-oneM2M solutions is based on the use of specialized interworking Application Entities that are interfaced to the CSE via standard Mca reference points.

Such specialized applications are named Interworking Proxies and are shown in FIG. 6. The Interworking Proxy Application Entity (IPE) 602 is characterized by the support of a non-oneM2M reference point, and by the capability of remapping the related data model to the oneM2M resources exposed via the Mca reference point.

The remapping is typically supported via a full semantic interworking of the data model used by the non oneM2M and a related protocol interworking logic, and, depending on the complexity of the non oneM2M data model, can imply the definition of a complex set of resources built via the basic oneM2M ones, or a simple direct mapping of the communication via the containers.

The oneM2M architecture defines the following three variants of how interworking through an Interworking Proxy Application Entity over Mca can be supported:
1) Interworking with full mapping of the semantics of the non-oneM2M data model to Mca.
  This is typically supported via a full semantic interworking of the data model used by the non-oneM2M solution and the generic data model used in oneM2M (based on usage of containers) for exchanging application data. The IPE includes the related protocol interworking logic.
  Depending on the complexity of the non-oneM2M data model, this can imply that the Interworking Proxy Application Entity constructs a complex set of resources (built from the basic oneM2M resources) in the CSE. These resources are oneM2M representations of the non-oneM2M data model and are exposed by the IPE on Mca. They enable CSEs and AEs to access the entities in the non-oneM2M via the IPE.

The benefit of this level of interworking is that it offers a unique solution for enabling communications among different protocols. The data model of the non-oneM2M solution determines its representation (the names, data types and structure of the containers) in the M2M System. It caters for different levels of interworking including protocol interworking, semantic information exchange, data sharing among the different solution and deployments. It enables offering additional values with respect to what is today available via existing protocols and proprietary service exposures.

Note: With this level of interworking an M2M Application can access non-oneM2M solutions without the need to know the specific protocol encoding for these solutions. A drawback is that the IPE also potentially needs to interwork between a non-oneM2M security solution and oneM2M security. E.g. it needs to be the termination point of any non-oneM2M specific encryption.

2) Interworking using containers for transparent transport of encoded non-oneM2M data and commands via Mca.

In this variant non-oneM2M data and commands are transparently packed by the Interworking Proxy Application Entity into containers for usage by the CSEs and AEs.

In this case the CSE or AE needs to know the specific protocol encoding rules of the non-oneM2M Solution to be able to en/de-code the content of the containers.

3) Interworking using a retargeting mechanism.

The oneM2M specification goes on to indicate that these interworking approaches can be integrated into the CSE 302 to achieve a permanent part of the deployment.

Building the Environment for Things as a Service, BETaaS, is a European Union funded project that includes a platform for the execution of M2M applications, which is built on top of services deployed in a "local cloud" of gateways, the latter being the devices which provide the smart objects with connectivity to the Internet (e.g., smart phones, home routers, road-side units). BETaaS's main focus is defining adaptation layers 802 to interconnect BETaaS with the main architectures proposed at a European level for M2M communication, including ETSI M2M and IoT-A. In addition to being highly scalable, security, dependability and QoS features will be embedded "by design" into the BETaaS platform In this implementation the "Adaption Layer" is specific to the service layer with which the M2M/IoT device will communicate.

Device Management (DM) is the process in which a centrally located user can configure, monitor, diagnose, and otherwise manage a remotely located device. This is especially valuable when the devices are mobile in nature or deployed in remote areas that make access to them difficult. Typically, a DM server at a central site downloads commands to be executed on the device. A DM client running on the device will receive these commands and process the state changes necessary to execute the desired operations. This communication mechanism between the DM server and the DM client is implemented using defined procedures and message formats and is known as a DM protocol. Two of the well-known DM protocols are the Open Mobile Alliance (OMA) DM Protocol and the Broadband Forum (BBF) CPE WAN Management Protocol. Another emerging DM protocol is the OMA LWM2M Protocol.

FIG. 9 shows the OMA DM Protocol architecture in which a DM Server 902 sends device management commands to DM Clients running on devices. The DM Client maintains a set of Managed Objects (MO) 906 within a resource structure referred to as the DM Tree. These MOs 906 are used to manage a particular function on the device such as software updates. The management commands operate on the nodes of the DM Tree 908 and may cause state changes within the device.

In the BBF CPE was management protocol, OMA defined a DM Gateway that offers limited group management functionality through the use of the Gateway Management Object (GwMO). This GwMO targets providing software distribution to a group of devices managed by the DM Gateway. Since GwMO resides only on a DM Gateway, the group management is only available for devices connected to the gateway. Other DM devices cannot be managed in a group.

The OMA Lightweight M2M (LWM2M) Protocol provides a similar client-server architecture in which a LWM2M Server manages a LWM2M Client running on a device. FIG. 10 shows the LWM2M architecture and the different interfaces provided. These interfaces focus on communications between the LWM2M Server 1002 and the LWM2M Client 1004. There is no support for group operations in which a LWM2M Server 1002 can manage multiple LWM2M Clients on different devices. Operations are performed on Objects that reside on the device.

FIG. 11 shows the BBF TR-069 CPE WAN Management Protocol architecture where an Auto-Configuration Server (ACS) 1102 is used to manage Customer Premises Equipment (CPE) devices 1104, 1106 and 1008. The ACS uses Remote Procedure Calls (RPC) to perform management operations on the data models of the CPE devices 1104, 1106 and 1108.

The architecture of FIG. 11 specifies limited group management support through the use of multicast transport protocols such as File Delivery over Unidirectional Transport (FLUTE) and Digital Storage Media Command and Control (DSM-CC). This is limited for file transfers and specifically for downloads only. The ACS 1102 will provide each CPE the details of the multicast group to join to initiate the file transfer. In addition, provisions are made in some RPC calls to allow an ACS 1102 the ability to set or get multiple parameter values from the same CPE. These provisions are only enabled for the corresponding RPC call and are limited to the same CPE only.

Service Discovery is generally conducted by a client to determine the ID, IP address, host and/or port for a desired service which is either statically provisioned at installation or manually configured via management or control tools and listed in a database or container accessible by the client, or registered at a server and maintained in the registry database or directory which is also accessible by the client.

DNS server may be used for both service and device discovery. But here, only DNS Service Discovery (DNS-SD) is discussed. DNS-SD built on top of the Domain Name System (DNS). It allows clients to discover a list of named services by type in a specified domain using standard DNS queries. The service instance can be described using a DNS service (SRV) (RFC 2782) and DNS text (TXT) (RFC 1035) record.

DNS resource records (RR) are named and structured on a DNS server to facilitate service discovery. Given a type of service that a client is looking for, and a domain in which the client is looking for that service, the DNS-SD allows clients to discover a list of named instances of that desired service, using standard DNS queries for a particular service instance described using a DNS SRV record and DNS TXT record. The SRV record has a name of the form "<Instance>.<Service>.<Domain>" and gives the target host and port where the service instance can be reached. The DNS TXT record of the same name gives additional information about this instance, in a structured form using key/value pairs. A client discovers the list of available instances of a given service type using a query for a DNS pointer (PTR) record with a name of the form "<Service>.<Domain>", which returns a set of zero or more names, i.e. the names of aforementioned DNS SRV/TXT record pairs.

SUMMARY

Methods and procedures allow devices to interwork with various types of service layers. Devices can be updated to support the protocol of the M2M/IoT service layer that is being communicated with.

One procedure defines how a device coordinates/initiates the download of a service layer API that is compatible with the service layer the device is attempting to use.

Another procedure defines how a service layer coordinates the autonomous update of a device with the proper service layer API which allows the device to then communicate and use services supported by the service layer SW component to the device.

A procedure defines how a service layer can detect a device or application lacking proper service layer functionality and can trigger a management entity to update the device or application with the service layer API required such that the device can then register to the service layer and use its services.

A procedure defines how a device or application can be customized or optimized to the service layer that it is registered to and using.

With these procedures, benefits are realized for product manufactures, application developers and consumers of the products. Product manufacturers can reduce the number of variations of their product that they need to support, while application developers can be able to create more feature rich applications rather than implementing multiple service layer interfaces. The consumer benefits by being able to select from a much larger variety of M2M/IoT devices and/or applications and integrate and configure them seamlessly. M2M/IoT devices and applications can remain relatively small since they need only include the ability to communicate with the single M2M/IoT service layer deployed, rather than supporting all known options. M2M/IoT devices and applications also remain scalable because they can be updated to support new M2M/IoT service layer deployments.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

There are many M2M/IoT proprietary systems deployed as well as some standardized systems in the process of being deployed. M2M/IoT devices and/or applications and service layers built using proprietary systems are not able to work with M2M/IoT systems compliant with emerging standardized systems. This can create a barrier to acceptance of the new standards compliant systems because of capital and infrastructure costs associated with replacing and/or reconfiguring deployed systems.

Figure 1:
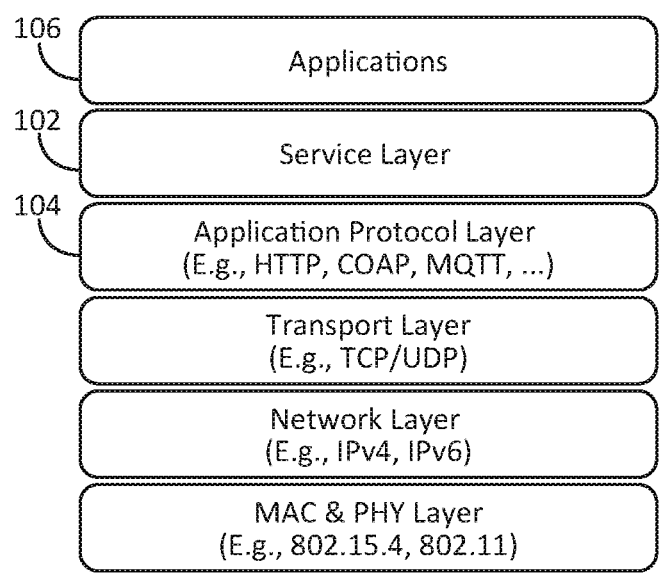
FIG. 1 is a diagram of an exemplary protocol stack supporting a service layer.
Figure 2:
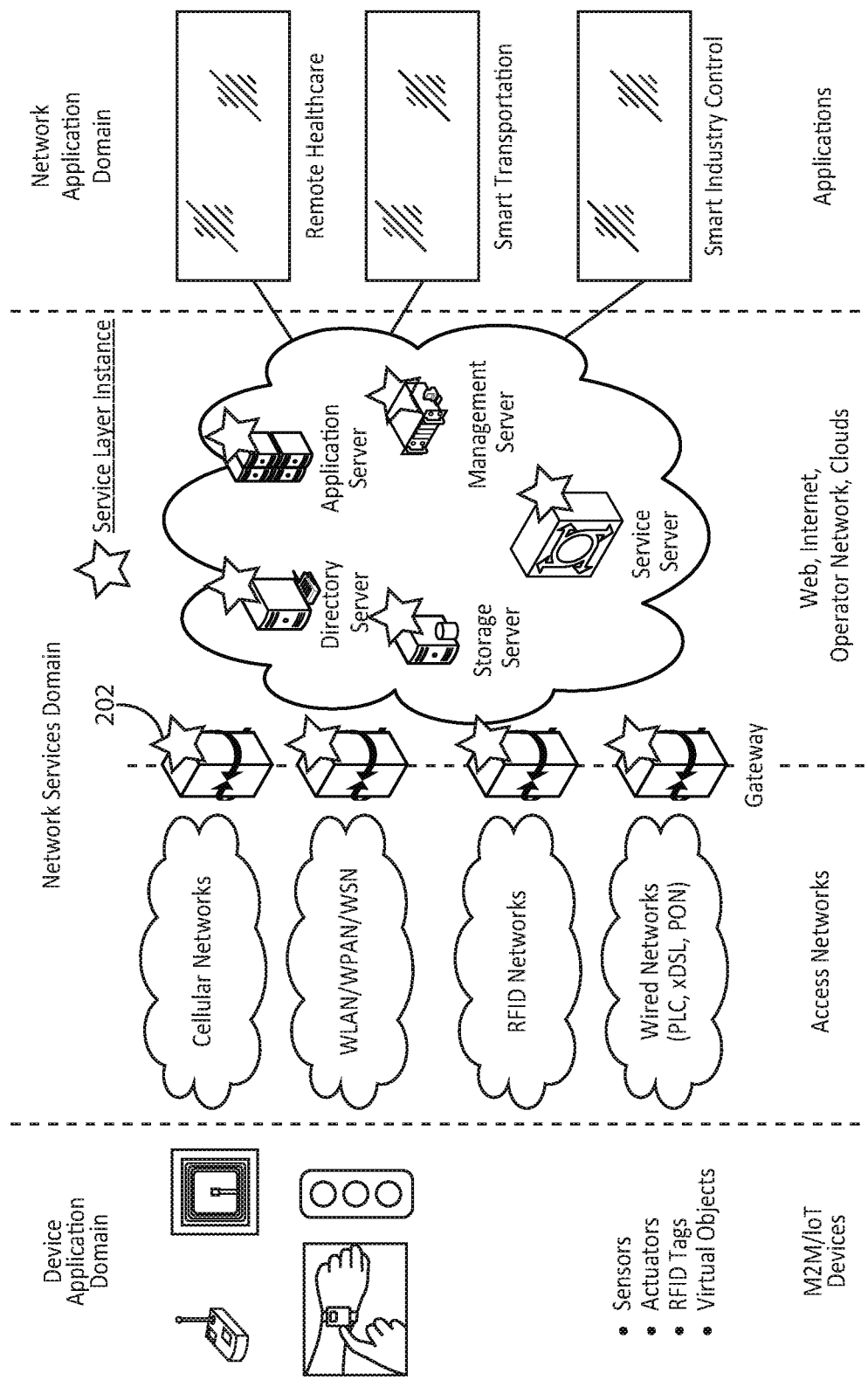
FIG. 2 is a diagram of an exemplary M2M/IOT service layer deployment within a network.
Figure 3:
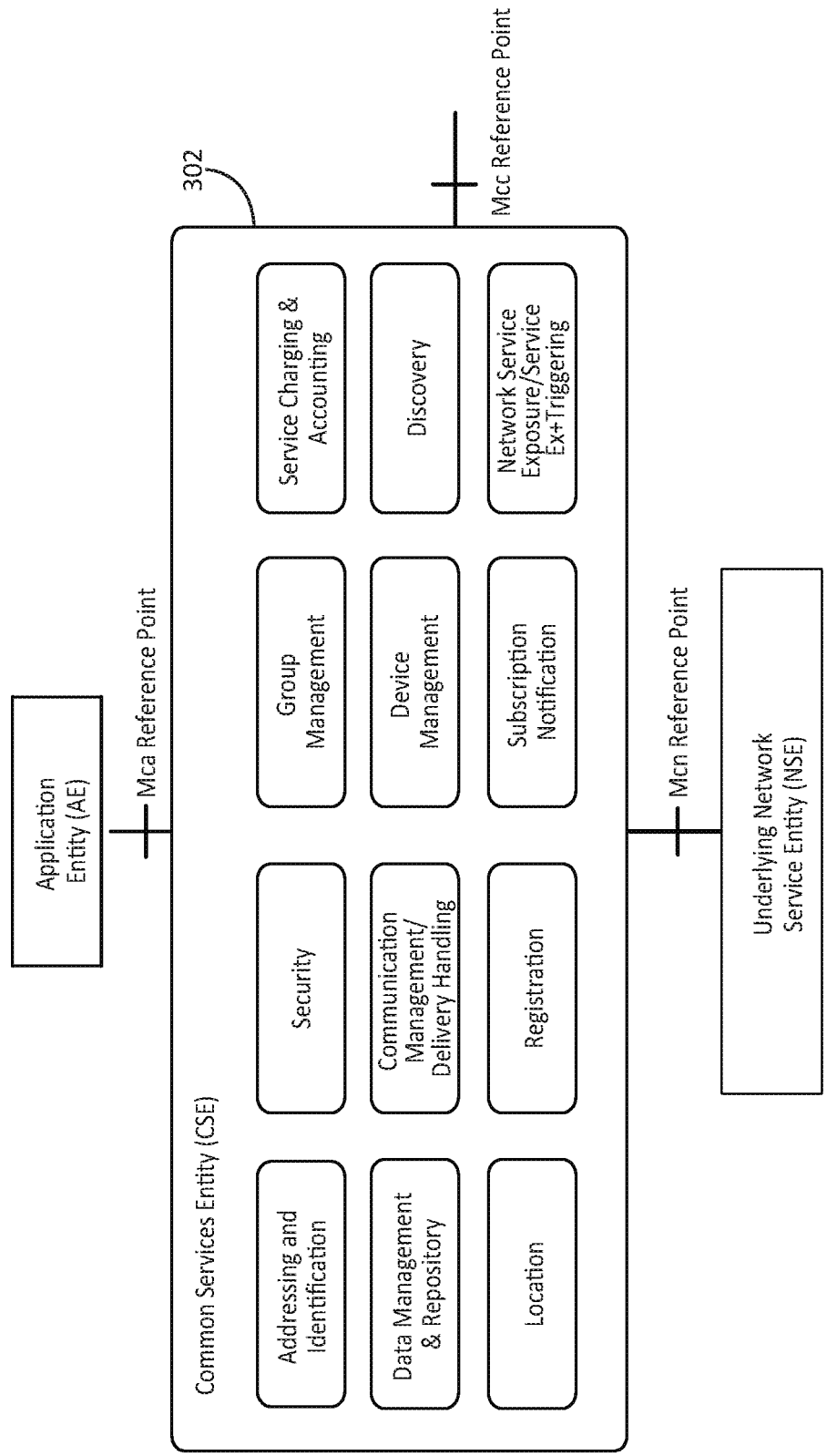
FIG. 3 is a diagram of Common Services Functions (CSFs) in oneM2M service layer.
Figure 4:
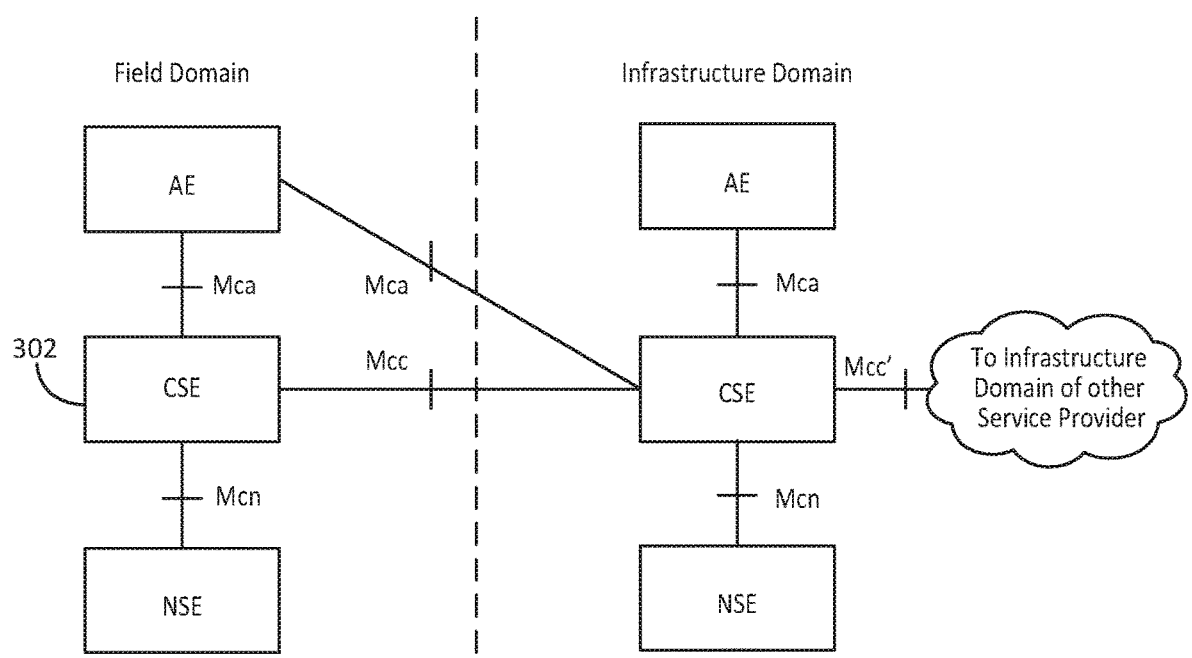
FIG. 4 is a diagram of a oneM2M service layer resource-oriented architecture.
Figure 5:
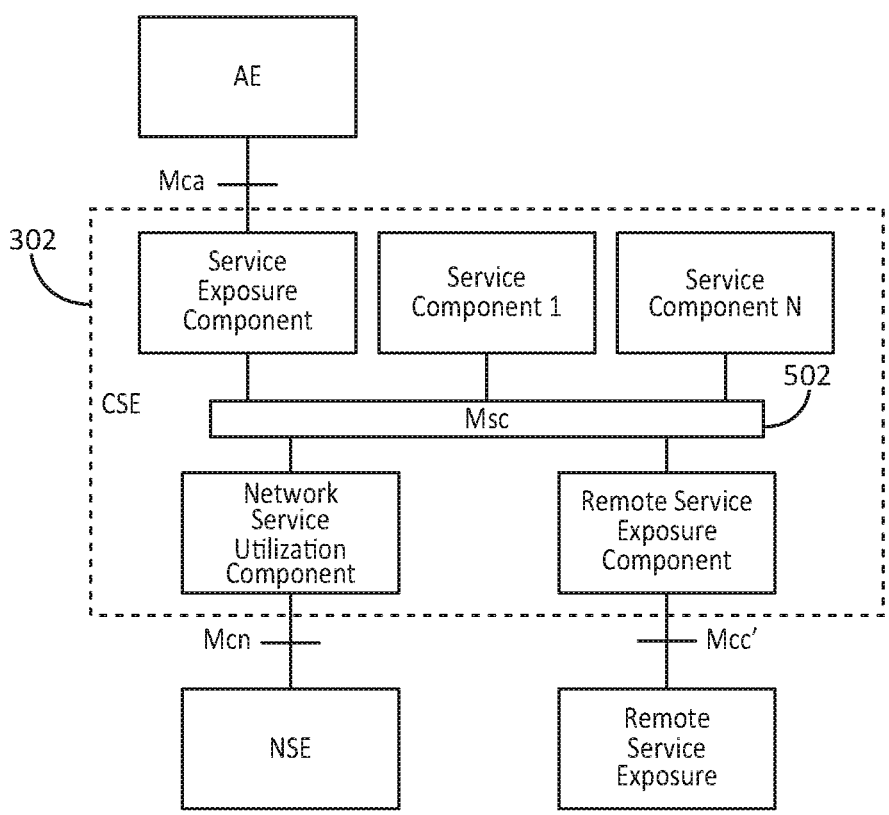
FIG. 5 is a diagram of a oneM2M services component architecture.
Figure 6:
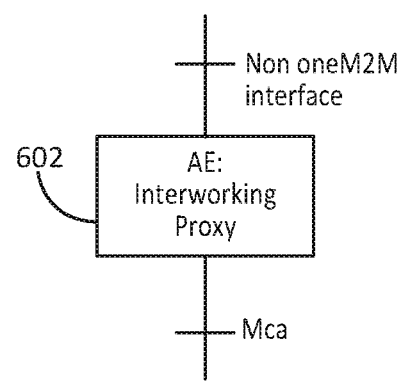
FIG. 6 is a diagram of a oneM2M interworking proxy.
Figure 7:
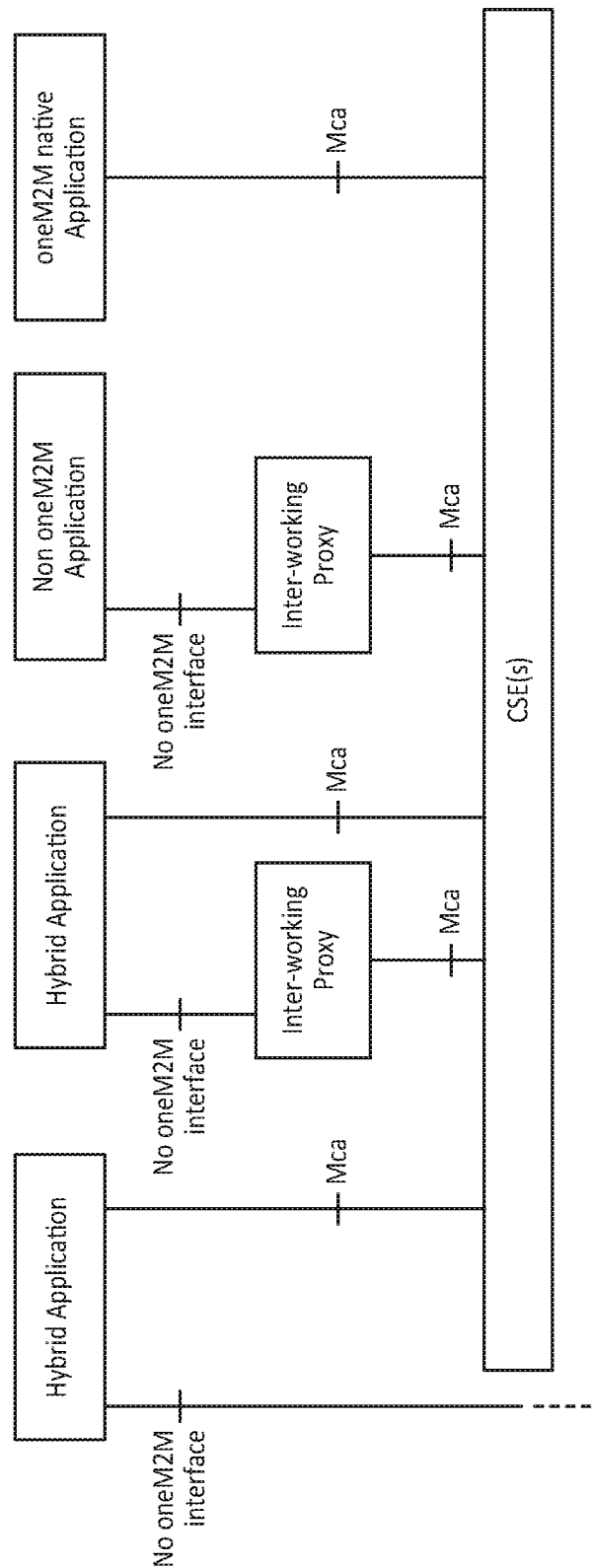
FIG. 7 is a diagram of scenarios supported by a oneM2M architecture.
Figure 8:
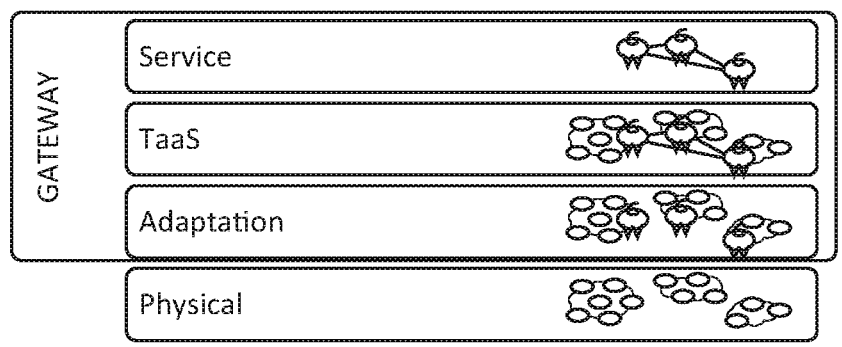
FIG. 8 is a diagram of a BETaaS device stack.
Figure 9:
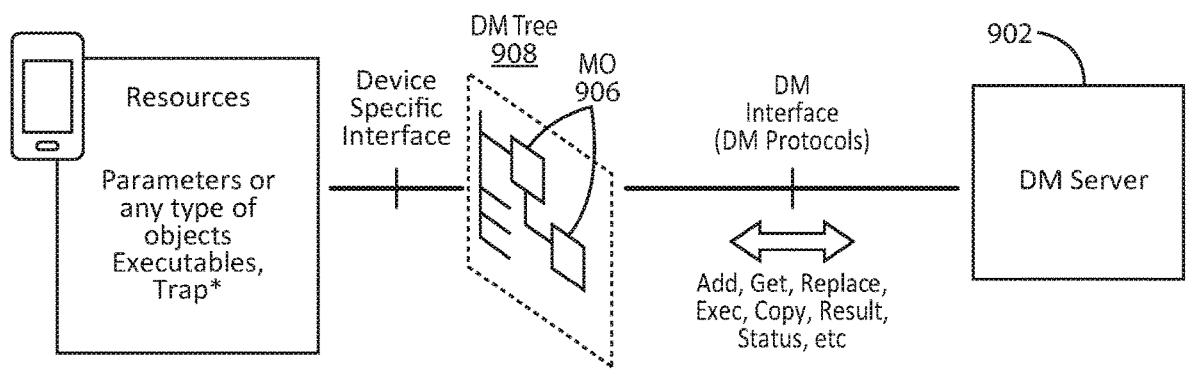
FIG. 9 is a diagram of an OMA DM protocol architecture.
Figure 10:
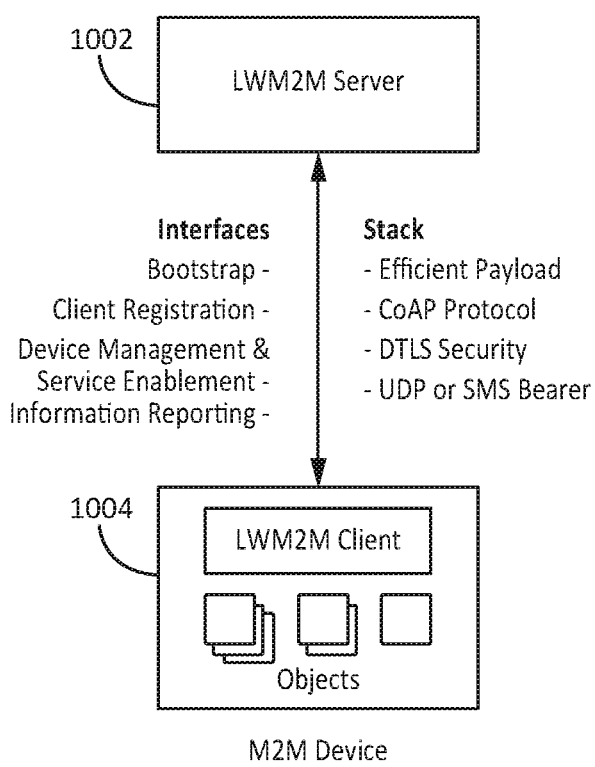
FIG. 10 is a diagram of an LWM2M protocol architecture.
Figure 11:
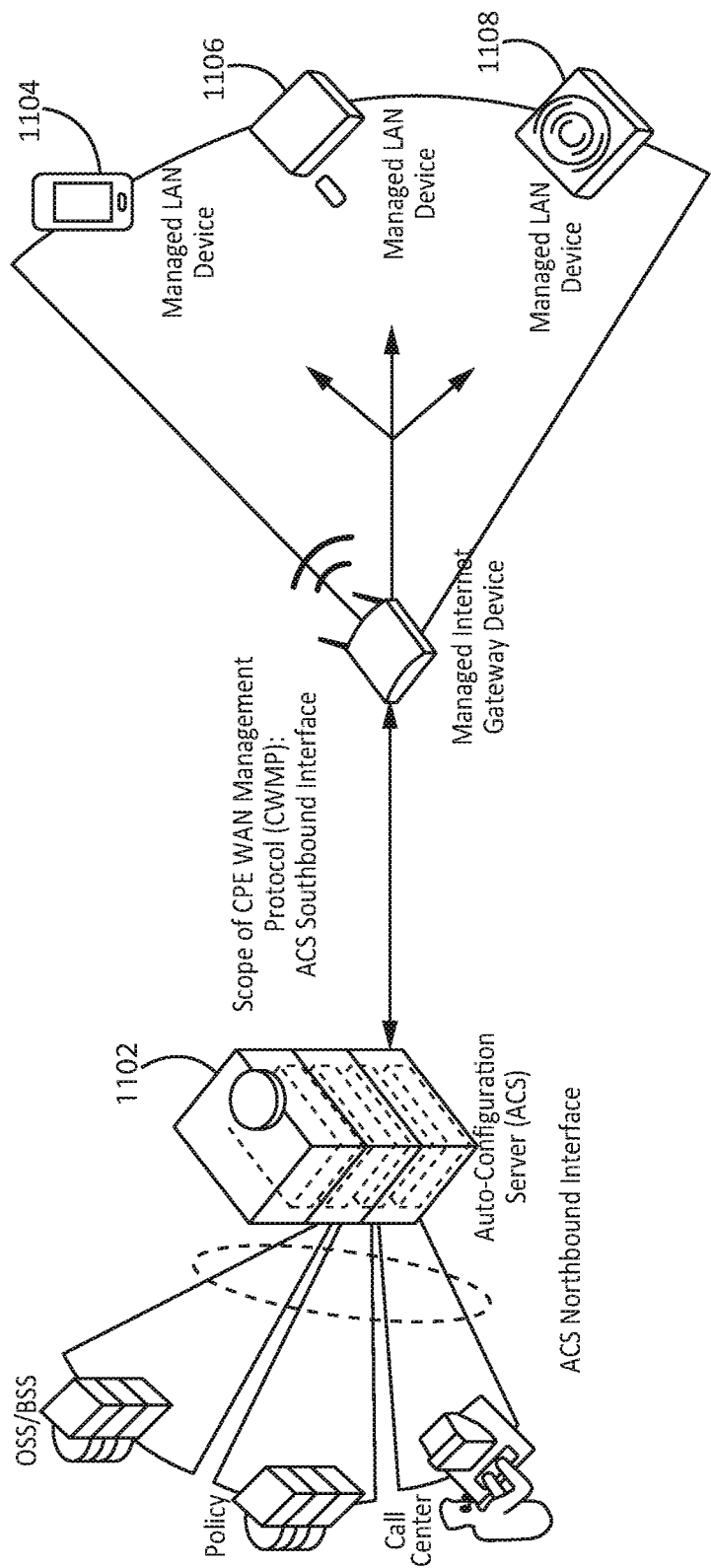
FIG. 11 is a diagram of a BBF TR-069 CPE WAN management protocol architecture.
Figure 12:
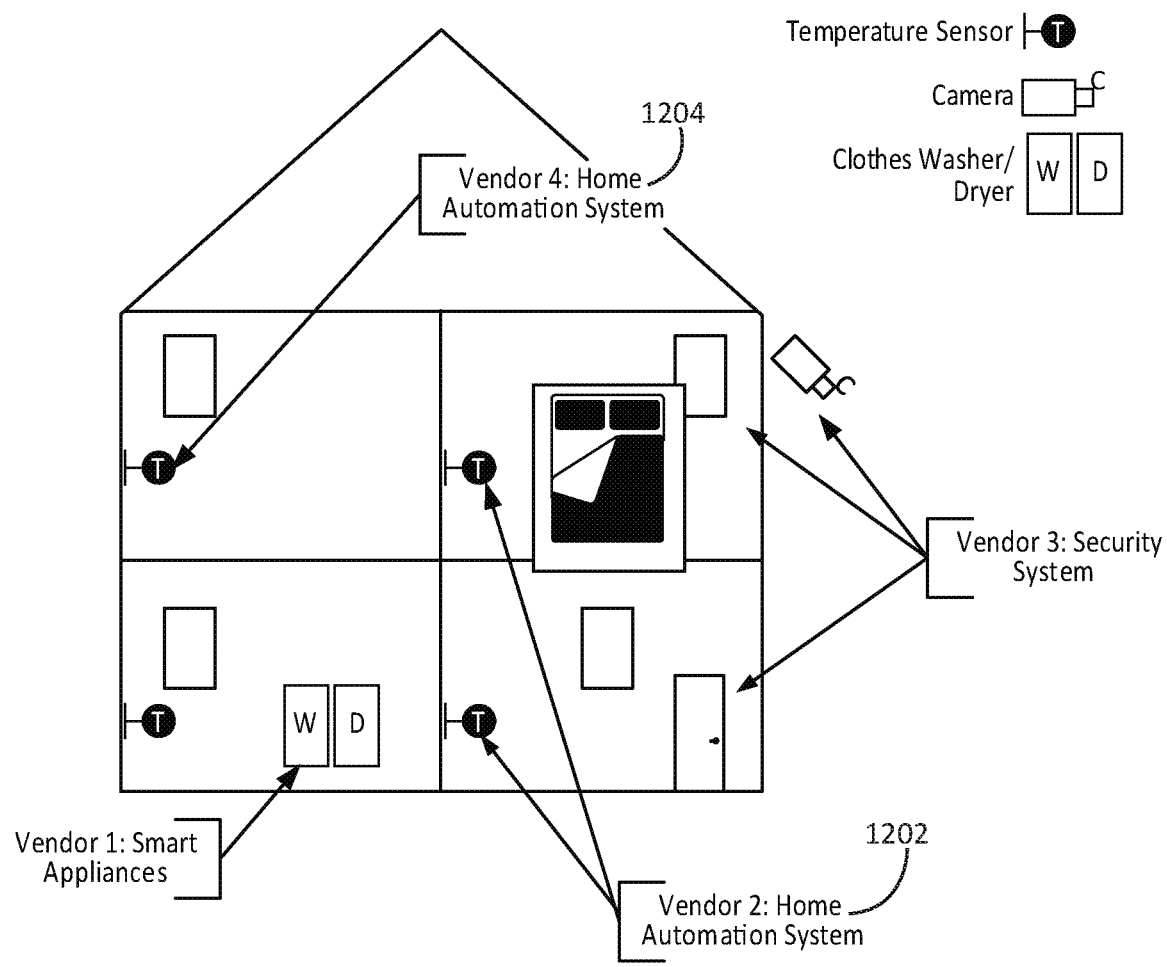
FIG. 12 is a diagram of a smart home deployment embodiment.

The use case shown in FIG. 12 highlights several limitations of M2M/IoT services and devices. This use case describes a home automation system used by a homeowner, but the actor could be any entity, e.g. factory automation, traffic devices, etc. The homeowner is trying to setup security and automation in the home. The homeowner finds two "Home Automation Systems" 1202 and 1204 where some of the sensors in Product A meet the needs of the home owner, while some of the sensors in Product B are better. The homeowner can choose the product that best meets the majority of his requirements (but ultimately falls short of some requirements), or use separate standalone/non-compatible systems to meet all of the requirements (but suffer the consequences of having to use/manage the separate systems). In this home use-case, there are four different vendors of Smart Appliances and home automation or security systems. The homeowner is likely to have four different service layer components and four different applications to control and monitor these devices. What the homeowner really wants is a single way to monitor and control his entire Smart Home.

Additionally, in order to take advantage of value-added services, the vendors are each responsible for developing applications that support multiple service layer protocols. This is problematic since vendors would much rather focus their time and resources developing new "product capabilities" than multiple versions of service layer interfaces.

This creates problems for all stakeholders in the M2M/IoT ecosystem: Consumers either do not get all of their needs met or must be burdened with the overhead and complexity of setting up and maintaining separate networks and devices to meet their needs. M2M/IoT Device manufacturers have to build multiple versions of their product to achieve compatibility with the different service layer technologies. This increases development time and resources as well as support costs. Similarly, M2M/IoT application developers have to build multiple versions of their software to achieve compatibility with the different service layer technologies. This increases development time and complexity.

What is needed is a method that will allow M2M/IoT systems, both proprietary and standards compliant, to interwork such that new M2M/IoT devices and/or applications can be used with existing M2M/IoT service layer deployments while adding the ability to use new feature rich service layers, so that the home owner can operate and control all of the M2M/IoT devices and sensors from multiple vendors using a single application.

The methods of interworking defined in oneM2M require the reception of a request from a device/application using the 'foreign' protocol, translation of each component of the request to the 'native' protocol and then transmission to the service layer. Likewise, a response from the service layer needs to be translated from the 'native' protocol to the 'foreign' protocol. While this approach can work and may be a suitable solution for non-constrained platforms, it involves the addition of 'proxy' services that increase the processing needed to handle the request, which is not always well suited for constrained platforms and increases complexity on other platforms.

All M2M/IoT devices and/or applications provide some functionality that is completely independent of the service layer used to communicate with other M2M/IoT devices and/or applications, such as ones to measure temperatures or display temperatures. The communication between these end points (M2M/IoT devices and/or applications) is dependent on the service layer, such as oneM2M primitives, ETSI primitives, or Zigbee profile messages. In order to communicate with any given service layer the M2M/IoT devices and/or applications have to perform service layer specific operations that can be generalized to some basic operations common to all service layers.

This method defines an architecture and a procedure by which M2M/IoT devices and/or applications can be designed, using a generalized service layer Interface (SLI) API, such that they can interwork with different service layer implementations. M2M/IoT devices and/or applications that support this method will typically do so in the form of a replaceable software or firmware module that implements the messaging and capabilities associated with a specific service layer (e.g., oneM2M).

It is understood that the functionality illustrated in FIG. 12, may be implemented in the form of software (i.e., computer-executable instructions) stored in a memory of, and executing on a processor of, a node of an M2M network (e.g., a server, gateway, device, or other computer system), such as one of those illustrated in FIG. 25C or 25D described below.

Sensor/Application Interworking Architecture

Figure 13:
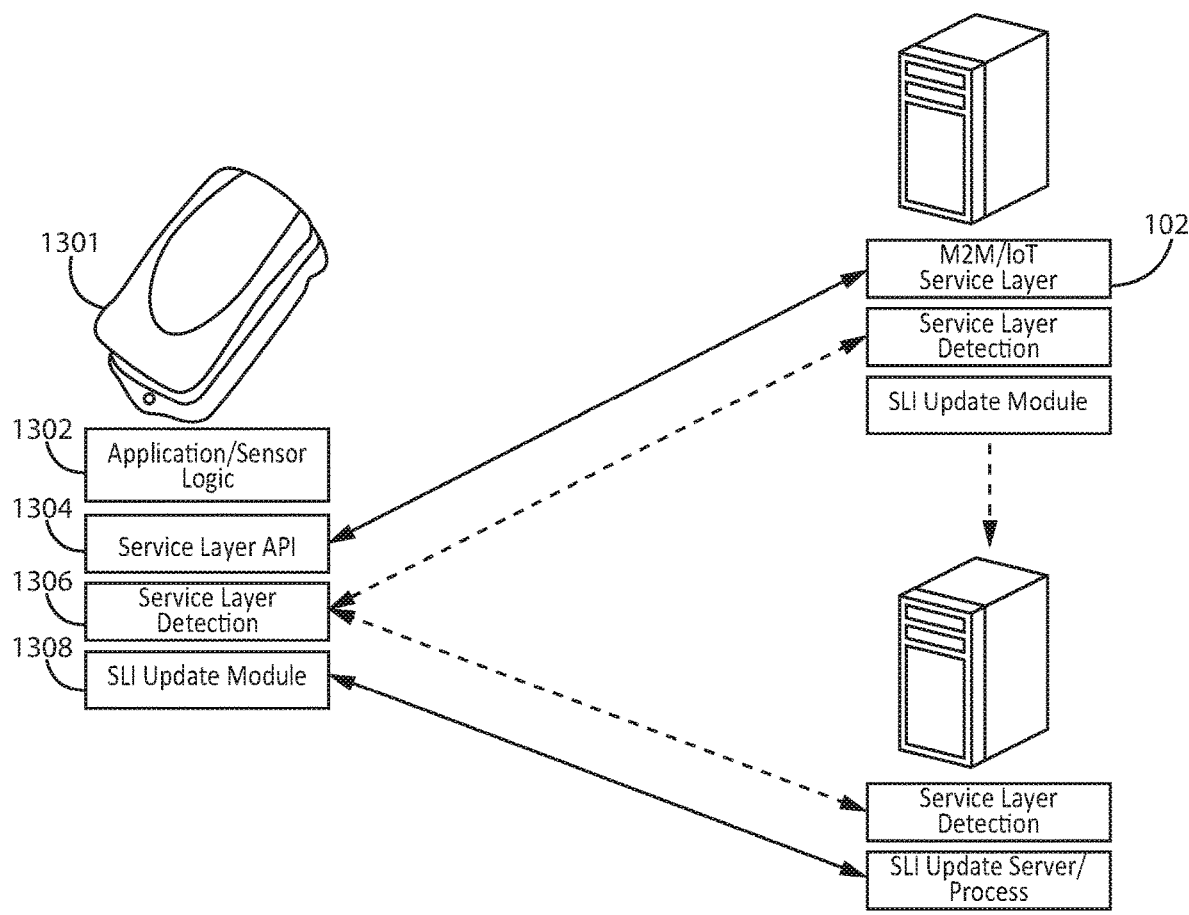
FIG. 13 is a diagram of M2M/IoT device or application interworking architecture.

FIG. 13 shows an architecture that supports interworking at the M2M/IoT device or application layer. In one embodiment, the main components of the architecture for the M2M/IoT device or application are:

M2M/IoT devices and/or applications logic 1302
service layer API 1304
Detection of M2M/IoT service layer Compliance/Incompliance 1306
Software/Firmware Update Server/Client 1308

By implementing the M2M/IoT devices and/or applications logic using the architecture above, manufacturers/developers can use the procedures described below to interwork with different service layer implementations.

In FIG. 13, the lines represent the logical communication path for the type of information communicated. The actual information can be carried in the M2M/IoT service layer messages. Dashed lines represent paths that may optionally not be present. Details of the functionality of each of the components are shown below.

It is understood that the functionality illustrated in FIG. 13, may be implemented in the form of software (i.e., computer-executable instructions) stored in a memory of, and executing on a processor of, a node of an M2M network (e.g., a server, gateway, device, or other computer system), such as one of those illustrated in FIG. 25C or 25D described below.

M2M/IoT Service Layer API 1304

The first component of this architecture is the service layer API 1304. By using a service layer API 1304 when developing the software or firmware that controls a M2M/IoT device or application, a modification to the service layer API 1304 need have no effect on the application logic of the device. The specific methods or functions used can be tailored to the M2M/IoT device or application.

The service layer API 1304 defines a logical interface for basic operations that all service layerservice layers typically perform/support. The following paragraphs includes a list of operations that a service layer API 1304 could include. The operations can be more general or more specific and there could be other operations. These operations generally consist one or more M2M/IoT service layer Messages or primitives to implement the operation. For example, the "connect" operation could be implemented with an oneM2M Create AE primitive.

Connect/Disconnect: This is the process by which a M2M/IoT devices and/or applications connects to the service layer such that the service layer allows other operations to be performed. This can be as simple as an "announcement" of the presence of the M2M/IoT device and/or application or a multi-step authentication and authorization procedure.

Discover: One of the reasons to have a service layer is to make "data" accessible to other M2M/IoT devices and/or applications. The ability to discover data that is accessible is a basic capability, although it does not always have to be supported.

Retrieve/Receive: If the service layer supports a repository of data or a means to locate sources of data, there will also be a means to "GET" the data. This represents data coming into the device, either directly with a retrieve or indirectly with a receive.

Send/Transmit: Each service layer supports a method to send data generated by the Sensor/Application.

An example of this type of interface implementation is described below. When the M2M/IoT device and/or application logic uses a common interface, it facilitates changing the service layer with which it communicates without the need to change the higher level functions of the device. By including a device management client, such as LWM2M or OMA, the changing of the service layer can be done remotely or over the air.

M2M/IoT Service Layer Detection 1306

M2M/IoT service layers 102 generally communicate using primitives or messages transmitted with a specified format and content. The M2M/IoT service layer Detection procedures 1306 can use knowledge of the primitive/message formats to make a simple determination of "Compliant" or "Non-Compliant" or when possible, identify content in the primitive/message that clearly defines the M2M/IoT service layer 102. The presence or absence of certain keywords in the protocol bindings are one example of content that can be used for service layer detection.

For example, while ETSI M2M primitives and oneM2M primitives are similar, they each have keywords in the protocol binding that can be used to indicate the type of service. In oneM2M, a mandatory parameter for CREATE operations is the specification of the resource type, while in ETSI M2M primitives the resource type is not a primitive attribute because it can be inferred by parsing the "targetURI" of the primitive.

The service layer Detection process be performed at the M2M/IoT device 1301 or application 1302, at the M2M/IoT service layer 102, or at the service layer API Update Server/Process 308 depending on the deployment of the system. For example, using a legacy M2M/IoT service layer with no device interworking support, a "Non-Compliant" primitive will generate an error response to the M2M/IoT device or application that made the request. If the request came from a constrained device that does support device interworking, the error response could be forwarded to the service layer API Update Server/Process for detection or identification of the M2M/IoT service layer.

M2M/IoT Service Layer API Update Server/Process 1308

There are many ways to manage or update the software/firmware on a M2M/IoT device or application. For mobile devices, one of the Device Management procedures described above could be used. In a fixed sensor device, the updates or configurations could be run by a service or process running on a nearby server or during a setup/install process.

The M2M/IoT service layer API Update Server/Process 1308 could also host the service layer Detection logic.

M2M/IoT Devices and/or Applications Interworking Procedure

Figure 14:
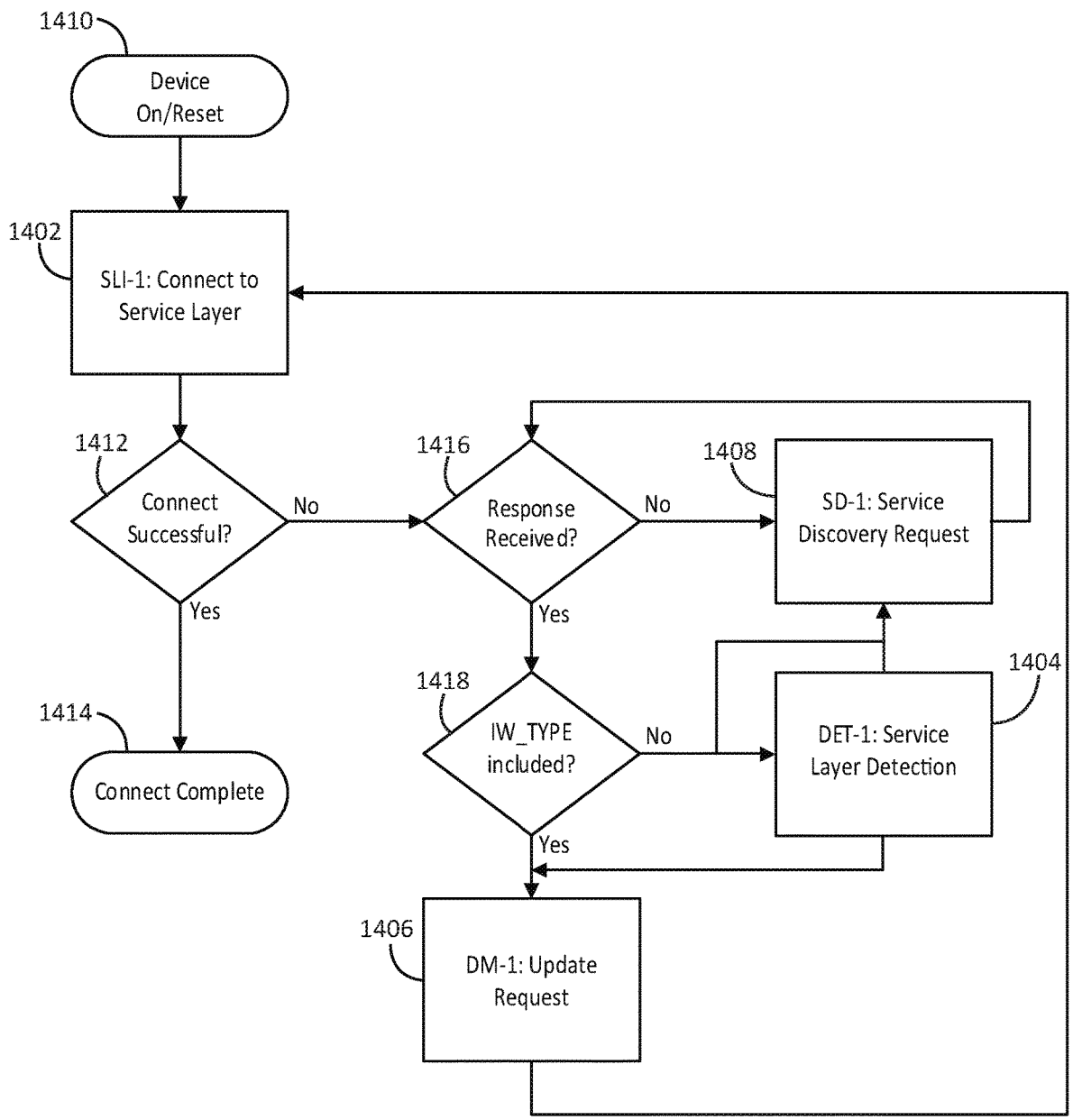
FIG. 14 is a flow chart of M2M/IoT device and/or application interworking procedure.
Figure 15:
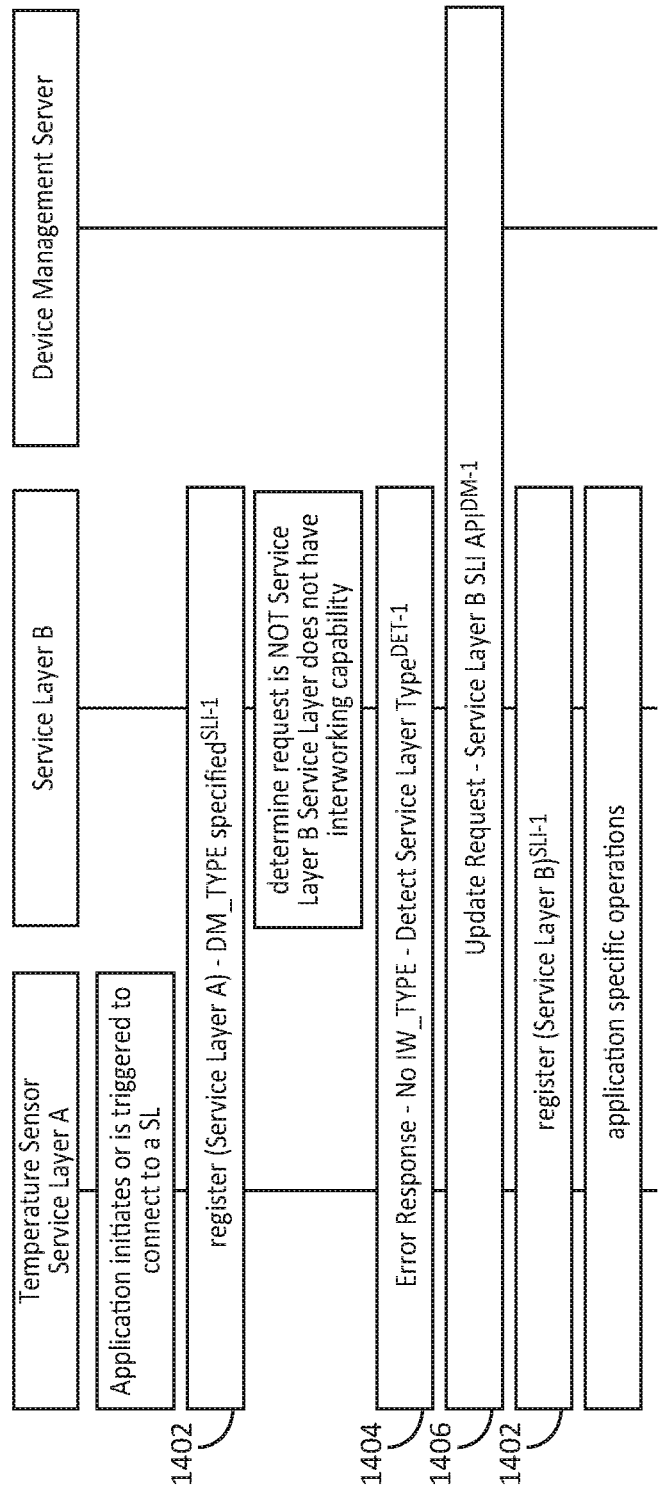
FIG. 15 is a diagram of interworking capabilities at the M2M/IoT device.

The procedure for device interworking is captured in FIGS. 14 and 15. Depending on the device, it is possible to skip steps or move steps to a different entity. For example, the DM Update request could also be done by the service discovery process or the M2M/IoT service layer.

The steps in these procedures are labeled with the following convention:

service layer Interface operations: SLI-n
Service Discovery operations: SD-n
Protocol Detection operations: DET-n
Device Management operations: DM-n
Decision logic: D-n In FIG. 14, an M2M device turns on in step 1410.

In step 1402 (SLI-1), a connection to the service layer is attempted. The M2M/IoT device and/or the application can use the "Register" method to connect to the service layer. The DM_TYPE parameter can be optionally included in this message so that a service layer could initiate a DM Update request on behalf of the device.

Optional DM_TYPE=Represents the DM Server for product software/firmware updates

Step 1412 checks if the connection was successful.

If the connection is successful, in step 1414, the connection is complete.

If the connection was not successful, in step 1416, it is checked if a response was received from the service layer.

If a response was not received, a service discovery request can be sent in step 1408 (SD-1). The Service Discovery request, can indicate the "current" SL protocol or the protocol detected, along with the DM Capabilities.

Optional IW_TYPE=service layer Interface APIs supported/preferred

Optional DM_TYPE=Represents the DM Server for product software/firmware updates

If a response was received, in step 1418, it is checked to see if the service layer sent an indication of supported service layers.

If such an indication was sent, in step 1406 (DM-1), an update request to the DM (SLI API) can be sent by the M2M device. It is also possible that the "service layer Detection" occur at the DM Server by including the error message in the DM Update Request.

If no indication was sent, a service layer detection step 1404 (DET-1) can be done. Based on the information contained in the response, the device can optionally detect the type of service layer, in step 1404, and then either begin Service Discovery, in step 1408, or directly issue a DM Update Request, in step 1406.

Figure 16:
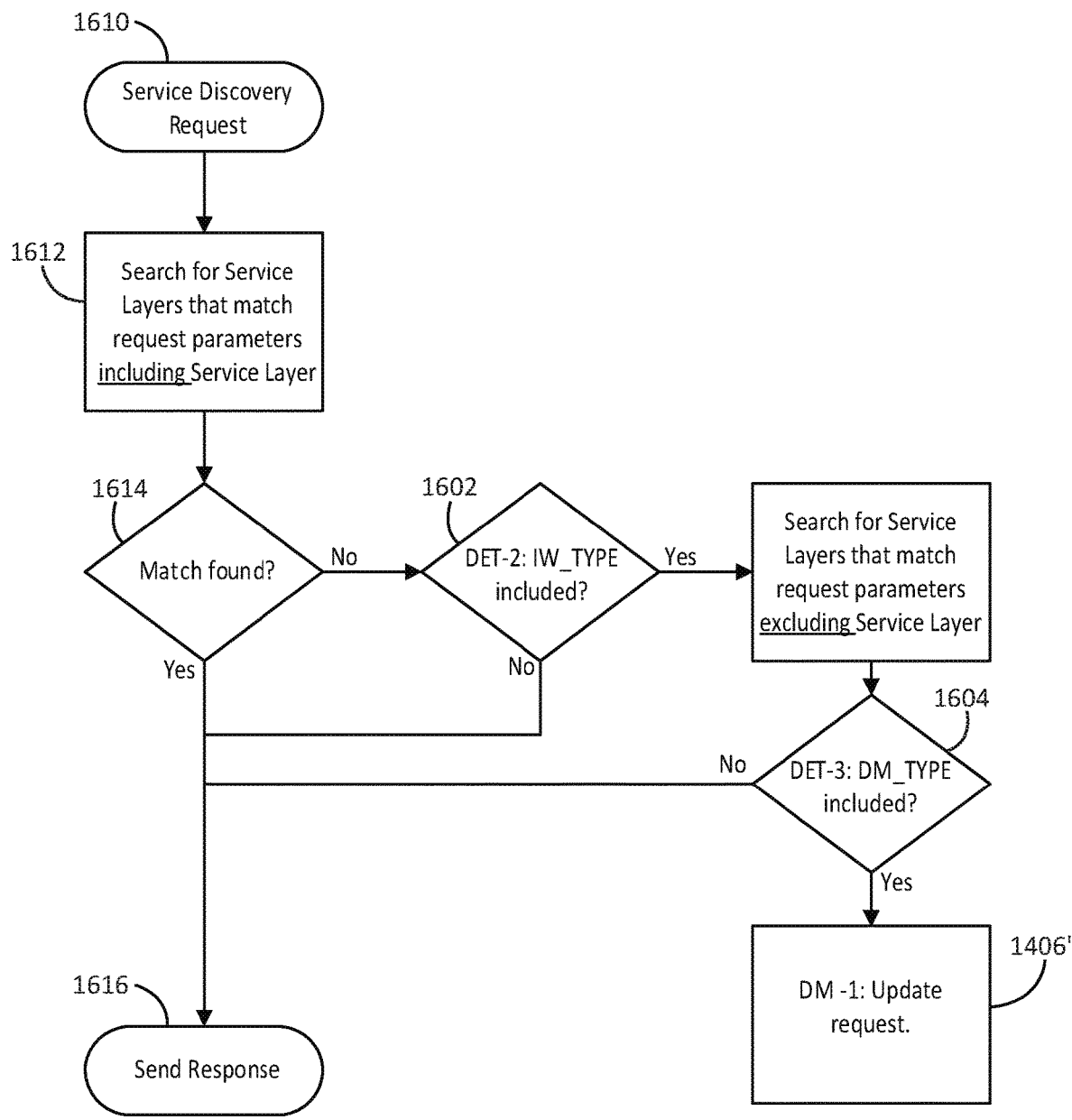
FIG. 16 is a flow chart of service discovery device interworking procedures.
Figure 17:
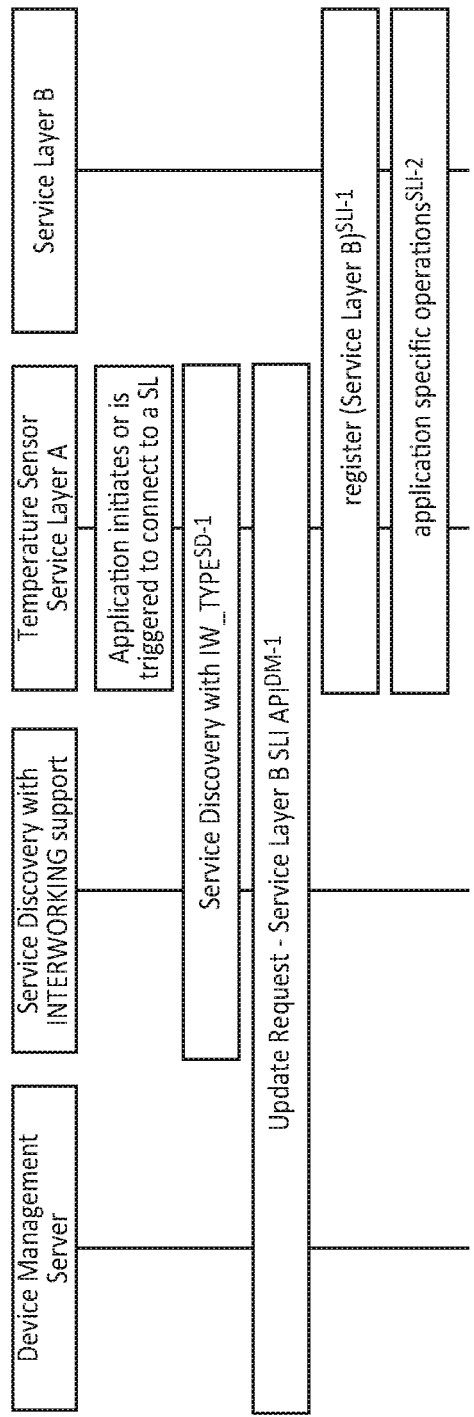
FIG. 17 is a diagram of service discovery with interworking support.

Service Discovery for M2M/IoT service layers can be modified to support device interworking. As shown in FIGS. 16 and 17, if the Service Discovery request message can include information regarding its interworking capabilities it can expand the search process to other service layers, for example the following represents the information in a service discovery request, highlighting the new interworking capability information:

DM_TYPE=Represents the DM Server for product software/firmware updates

IW_TYPE=Represents the service layer Interface APIs supported e.g:

"SERV PROVIDER=idcc&IW_TYPE=etsi&IW_TYPE=oneM2M&DM_TYPE=OMA; http://manufacturer/productA/updates"

The following steps apply to FIG. 16 and FIG. 17

In FIG. 16, at the server, a service discovery request is received in step 1610. In a step SD-1 (not shown), a Service Discovery request is issued by the device to the server indicating the "current" SL protocol and the DM Capabilities.

Optional IW_TYPE=service layer Interface APIs supported/preferred

Optional DM_TYPE=Represents the DM Server for product software/firmware updates

In steps 1612 and 1614, it is checked if a service layer at the server is able to respond to the service discovery request. If so, a response is sent in step 1616.

If not, in step 1602 (DET-2), it is checked if the service discovery request indicates a preferred service layer type. If the Service Discovery Process knows or can determine that the requestor supports interworking capabilities, IW_TYPE for example, the search parameters for the discovery request can be expanded to generate results that include matches using different service layer protocols, or even removing the service layer parameter as a search criteria. This would generally generate more matches than the first search.

If the Service Discovery request indicates the Device Management Server for this device, it can trigger a DM Update request.

In step 1604, it is checked if a preferred device manager type is indicated.

An update can be done at step 1406' (DM-1) such as an update of the service layer API on the M2M device (Request to Update to SLI API). This can be a message that includes a list of the service layer Interface APIs that match the Service Discovery request, allowing the Device Management server to select one that matches and begin updating the device that issued the Service Discovery request.

IW_TYPE=service layer Interface API matched.

Enhancements can be made at the service layer to support device interworking. First, when the service layer detects a 'foreign' primitive, if direct support for device management is a capability of the service layer, the service layer can initiate a DM Update procedure. Otherwise, the service layer adds the interworking type to the error response.

Figure 18:
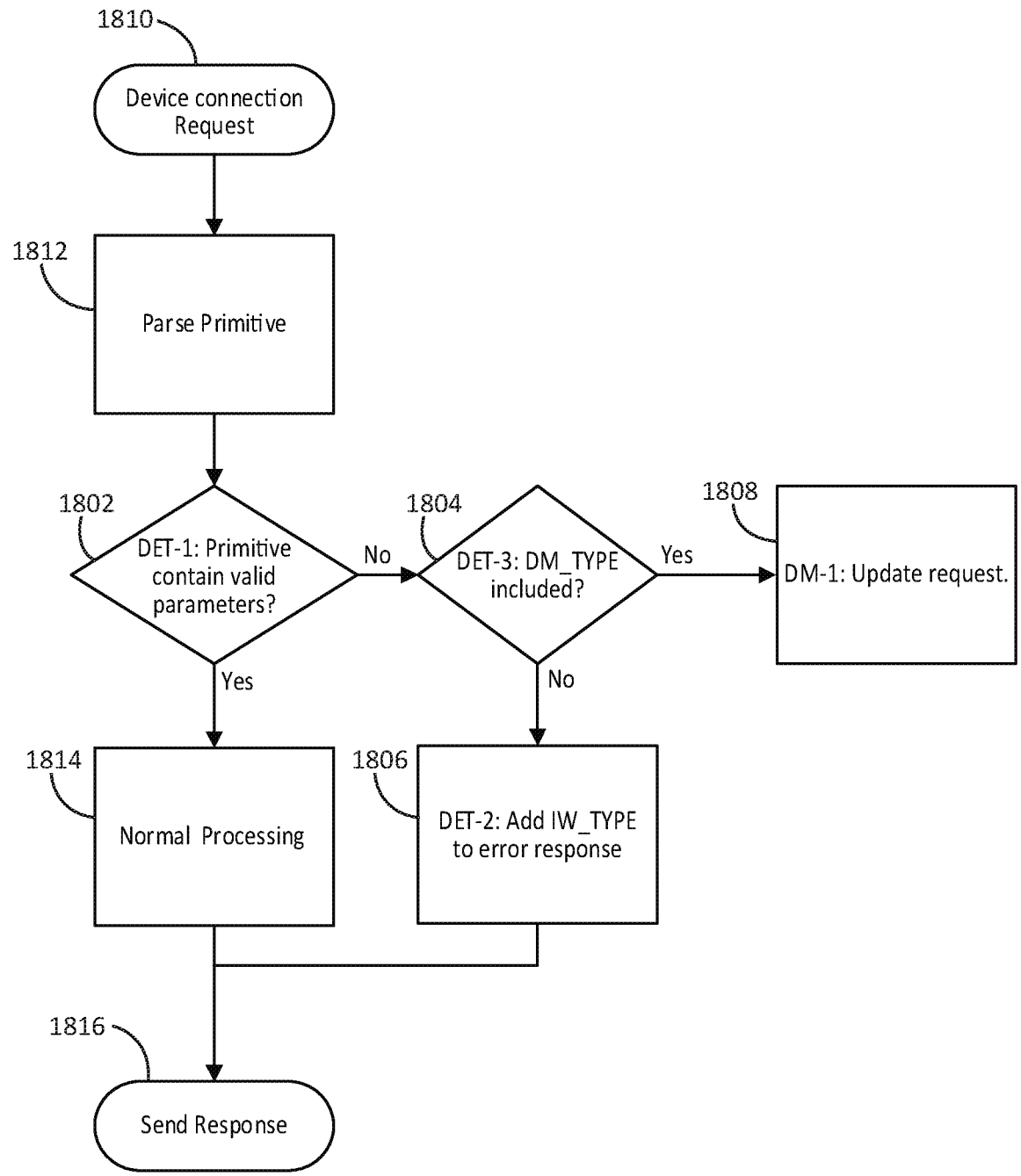
FIG. 18 is a flow chart of service layer processing for device interworking.
Figure 19:
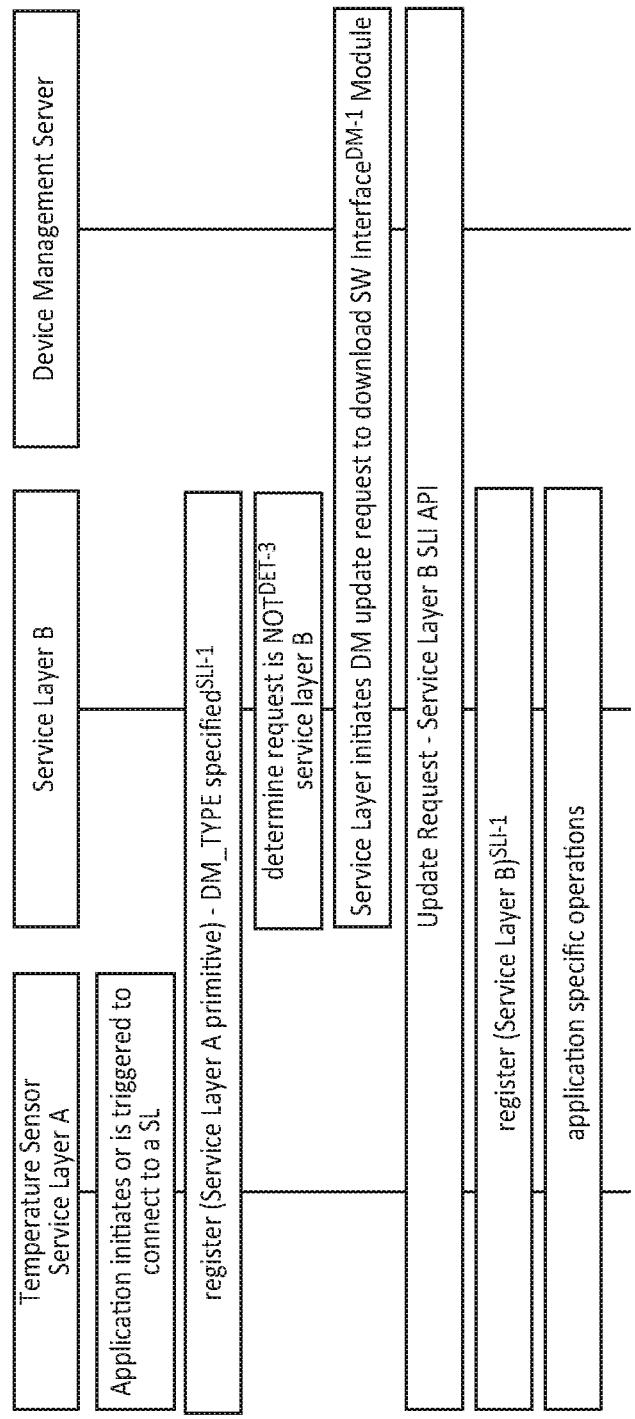
FIG. 19 is a diagram of a service layer with interworking support.

The following steps apply to FIG. 18 and FIG. 19:

For FIG. 18, a device connection request is received in step 1810. In step SLI-1 (not shown), M2M/IoT device and/or application uses the "Register" method to connect to the service layer. The DM_TYPE parameter is optionally included in this message so that a service layer could initiate a DM Update request on behalf of the device.

Optional DM_TYPE=Represents the DM Server for product software/firmware updates

In step 1812, the primitives from the device connection request are parsed.

In step 1802 (DET-1), it is checked to see if the primitives contain valid parameters. Based on the information contained in the request, the service layer can detect that the primitive is NON-Compliant.

If the primitives contain valid parameters, normal processing in step 1814 is done and a response is sent in step 1816.

If the primitives do not contain valid parameters, in step 1804, it is checked to see if the device manager is indicated.

In step 1804 (DET-3), the service layer can detect the type of interworking support based on the information contained in the request If a device manager is indicated in step 1808 (DM-1), an update request is sent to the device manager to update the M2M device. (Request to Update to SLI API) It is also possible that the "service layer Detection" occur at the DM Server by including the error message in the DM Update Request.

If a device manager is not indicated, a preferred service layer value can be sent in an error response in steps 1806 and 1816. In step 1806 (DET-2), the service layer can add IW_TYPE to the error response of the request to enable Interworking at the M2M/IoT device or application.

M2M/IoT Devices and/or Applications Interworking Procedure—Enhanced Provisioning Using the architecture and the procedure defined above enhanced provisioning can be performed by configuring or customizing the service layer Interface Module that is downloaded to the M2M/IoT devices and/or applications. The configuration/customization can be done in a variety of methods such as changing data values in a configuration file that is part of the SLI module or custom builds of the SLI module. The configuration/customization can modify the behavior of the methods described above.

The following use case will be used to describe some configurations that are possible.

An M2M/IoT Thermostat is purchased by a home user. The product manufacturer deploys the thermostat with a custom service that enables remote access, but also supports M2M/IoT device and/or application interworking procedures that allow compatibility with oneM2M systems as well. The home user has a oneM2M CSE deployed in a home gateway. The home user wants to integrate the thermostat with other oneM2M based applications rather than use the services offered by the thermostat manufacturer. The thermostat has an algorithm that can integrate remote temperature sensors in various locations around the home and outdoor temperatures while determining how to control the home's HVAC system.

Using the service layer Interface module defined above, examples of how they can be enhanced to provide custom configurations for a device once deployed in a service layer network are described in the following paragraphs.

Connect/Disconnect: The standard oneM2M registration process involves authentication and then the creation of an "AE" resource. The customization made during 'connect' is to add appropriate credentials for authentication.

Discover: the default discovery request is to search for resources using a label attribute equal to "temperatureSensor". The customization made during discovery is to refine the label attribute search to only the sensors that the home user wants to use by specifying additional discovery attributes, e.g. only temperature sensors that are child resources of OutdoorSensors and Zone1Sensors. Additionally, the customization includes creating subscriptions to these sensors.

Retrieve/Receive: the default configuration is to periodically request the temperature value from each of the sensors discovered. The customizations made so far utilize subscriptions and notifications, therefore this operation is removed.

Send/Transmit: The default configuration is to send status information using keywords "ON/OFF" for the HVAC systems. However, the oneM2M applications that the home owner has use "I/O" to indicate the states. The customization changes the value of the content instance resources so that is integrates easily with the rest of the system.

By supporting the ability to use device management capabilities to change the execution of these basic operations, the exact features of those operations can be modified/expanded/enhanced to provide a much better user experience for the home owner.

The following embodiment shows one way that the methods and procedures described in this disclosure could be implemented in an M2M/IoT Sensor. This embodiment is illustrated with the following example scenario:

Actors

Sensor Device: The device is a temperature sensor that is configured to communicate with an ETSI M2M service layer. It has a DM client and also uses a service layer Interface module as described above.

oneM2M IN-CSE: The service layer includes the detection/response capabilities described above.

DM Server that has the ability to customize the SLI module as described above. service layer Interface Module The temperature sensor measures the ambient temperature in the vicinity of the sensor device. The operations implemented by the SLI methods are:

Connect/Disconnect: When the sensor power is turned 'on' or 'reset' the sensor goes through a start-up sequence that includes registering to the M2M service layer and creating containers for the storage of data.

Send/Transmit: In steady state, the sensor sends temperature data at a periodic rate.

The sensor platform is provided with a default configuration to communicate with an ETSI SCL, however the product manufacturer also supports Sensor Interworking with oneM2M and Enhanced Provisioning capabilities. The following subsections show the call flows for ETSI primitives and oneM2M primitives, respectively.

ETSI SLI Module

Figure 20:
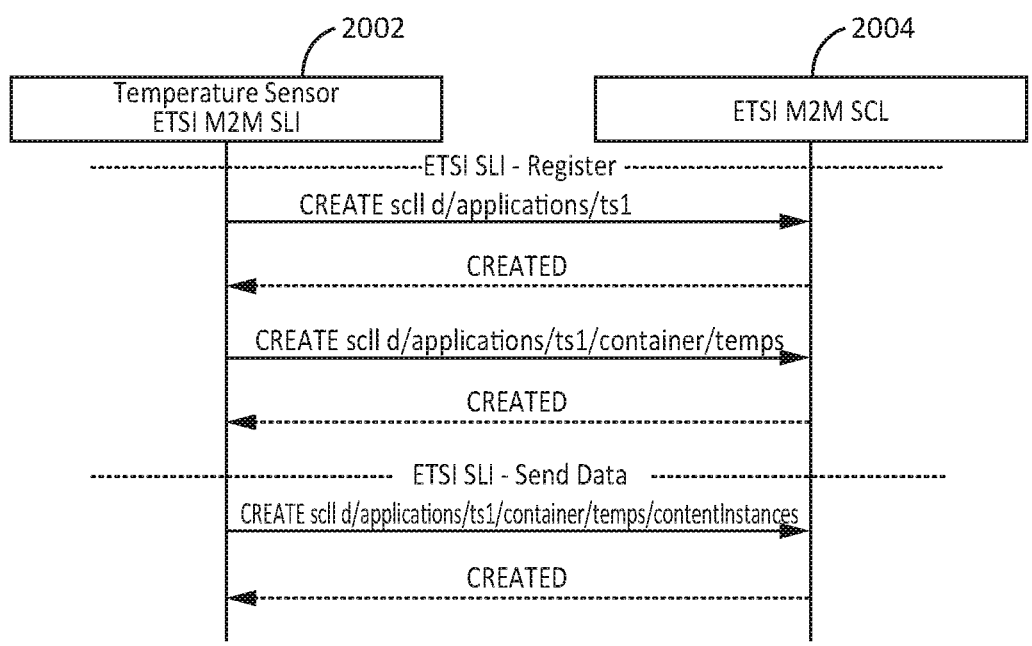
FIG. 20 is a message flow diagram of ETSI Primitives included in the SLI.
Figure 21:
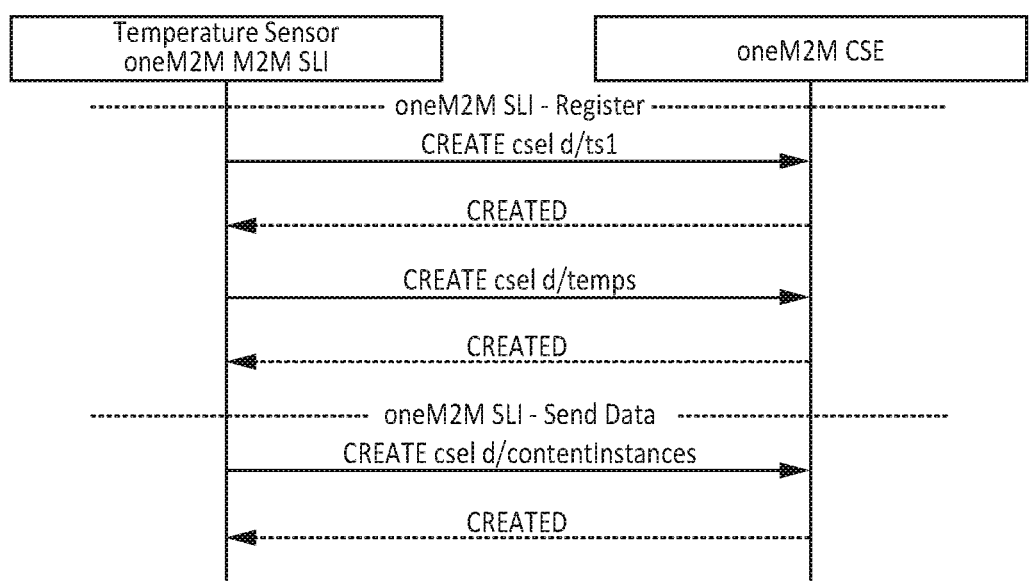
FIG. 21 is a message flow diagram of oneM2M Primitives included in the SLI.

FIG. 20 shows the call flows using between a temperature sensor 2002 and an ETSI M2M service layer 2004 using ETSI M2M primitives. These call flows can be executed when the temperature sensor calls the Connect and Send APIs.

Service Layer Detection Messages

An exemplary process of detecting that a message fails because it is not compliant with the native service is described in this section. In this example, the sensor is trying to register to an oneM2M CSE using an ETSI M2M primitive.

While ETSI M2M primitives and oneM2M primitives are similar, they each have keywords in the protocol binding that can be used to indicate the type of service. The absence of the correct keywords can also be used. For example, in oneM2M a mandatory parameter for CREATE operations is the specification of the resource type, while in ETSI M2M primitives the resource type is not a primitive attribute because it can be inferred by parsing the "targetURI" for the operation.

In this embodiment, when a CREATE primitive is received without including the resource type attribute (not a valid CREATE primitive in oneM2M), the error response includes information necessary to identify the SLI needed, e.g. IW_TYPE:oneM2M.

Figure 22:
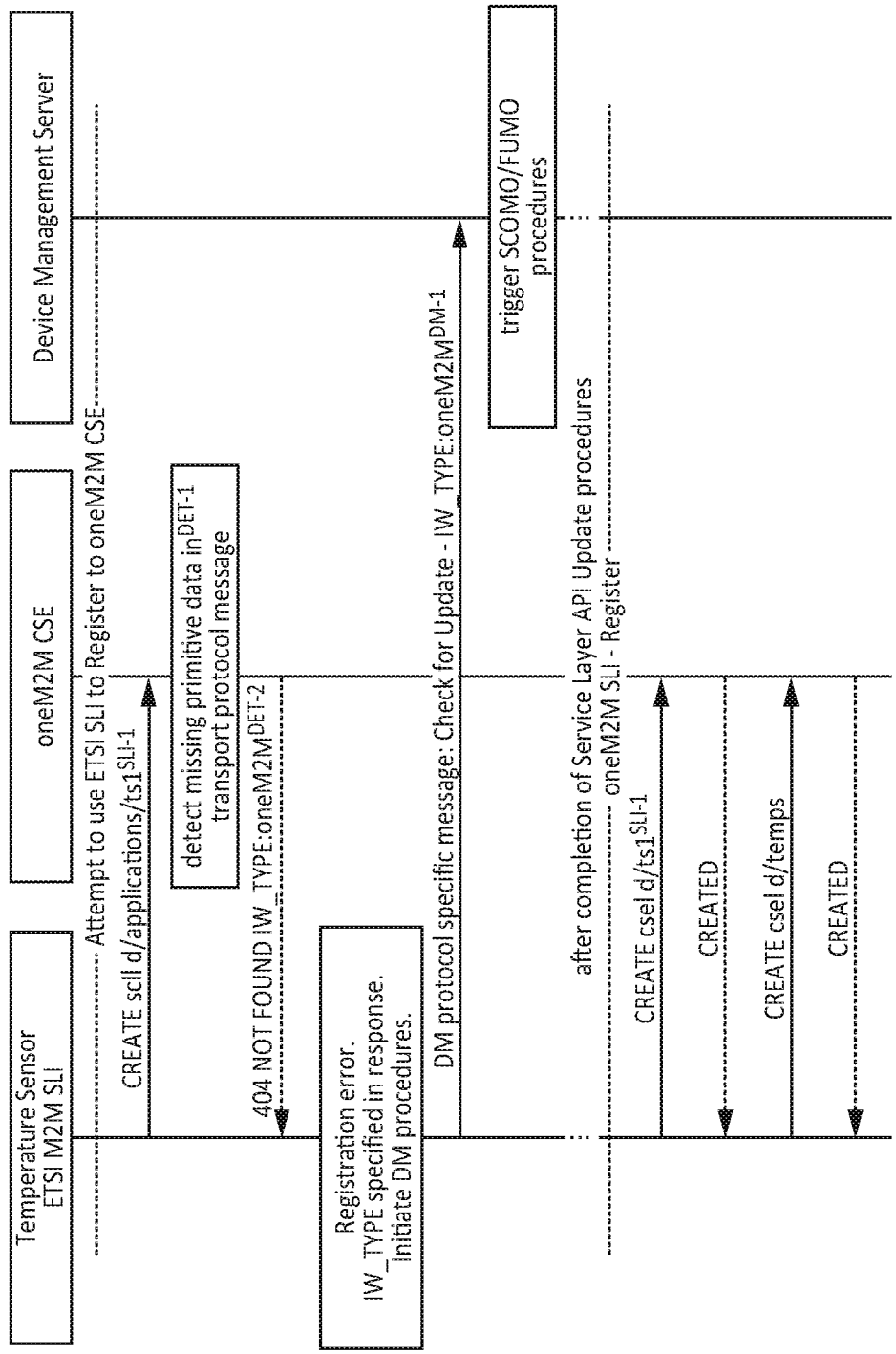
FIG. 22 is a message flow diagram of one embodiment of service layer detection procedure.

The following steps apply to FIG. 22:

In step SLI-1, the M2M/IoT device and/or application uses the "Register" method to connect to the service layer. The DM_TYPE parameter is optionally included in this message so that a service layer could initiate a DM Update request on behalf of the device.

Optional DM_TYPE=is not provided by the sensor or not supported in the service layer.

In step DET-1, the oneM2M service layer detects that the primitive request does not include the "resource type" parameter.

In step DET-2, the oneM2M service layer adds IW_TYPE:oneM2M to the error response. DM-1, DM Update Request—IW_TYPE:oneM2M Enhanced Provisioning Via the Service Layer Interface Module This embodiment will demonstrate how enhanced provisioning can be used to change the manner in which the device is provisioned so that it can use the service layer efficiently. For this use case, the sensor begins the connection process, without required authentication and security credentials.

The process for enhanced provisioning can be managed through a Setup application/process that sends defined/supported messages to the device. For example: IW_TYPE=oneM2M; ReqEntity=DEVICE_IDENTITY; CSE=cseBaseName; hostip_address:port When the temperature sensor receives this message, it can initiate DM procedures as before, with additional specifications (ReqEntity=DEVICE_IDENTITY; CSE=cseBaseName; hostip_address:port). The updated SLI module would make the following changes:

OLD Implementation:

```
Connect( )
{
    sendOneM2MRegister( );
}
```

NEW Implementation:

```
Connect ( )
{
    sendOneM2MRegister(ip_address, port, cseBaseName,
DEVICE_IDENTITY);
}
```

Service Layer API Updates

One embodiment for the process of detecting a message failure (because the message is not compliant with the latest/current version of the service primitives) is described in this section. In this example, the sensor is trying to register to an oneM2M CSE using native oneM2M primitives. However, the implementation of the CSE was upgraded to a new, non-backward compatible version of the primitive used for creating content instances.

The oneM2M service layer validates the primitive and the resource representation. When the CSE updates the defined representation of a resource, (for example, adding a new attribute that is considered Mandatory), M2M/IoT devices and applications that are using the previous version of the resource representation will no longer be able to use that primitive and will receive and error message.

Therefore, this embodiment defines that when the error message is sent, it includes information to assist the device getting updated, e.g. IW_TYPE=oneM2M; Version:ContentInstance_v2_1_2, indicating that the primitive that failed was performing an operation on a ContentInstance.

Using this information, the M2M/IoT devices and applications can be updated automatically. These procedures are shown in FIG. 23, where a create content instance primitive fails, which contains information in the error response such that the sensor initiates a device management session to update the SLI API with the correct version of the create content instance primitive.

Figure 23:
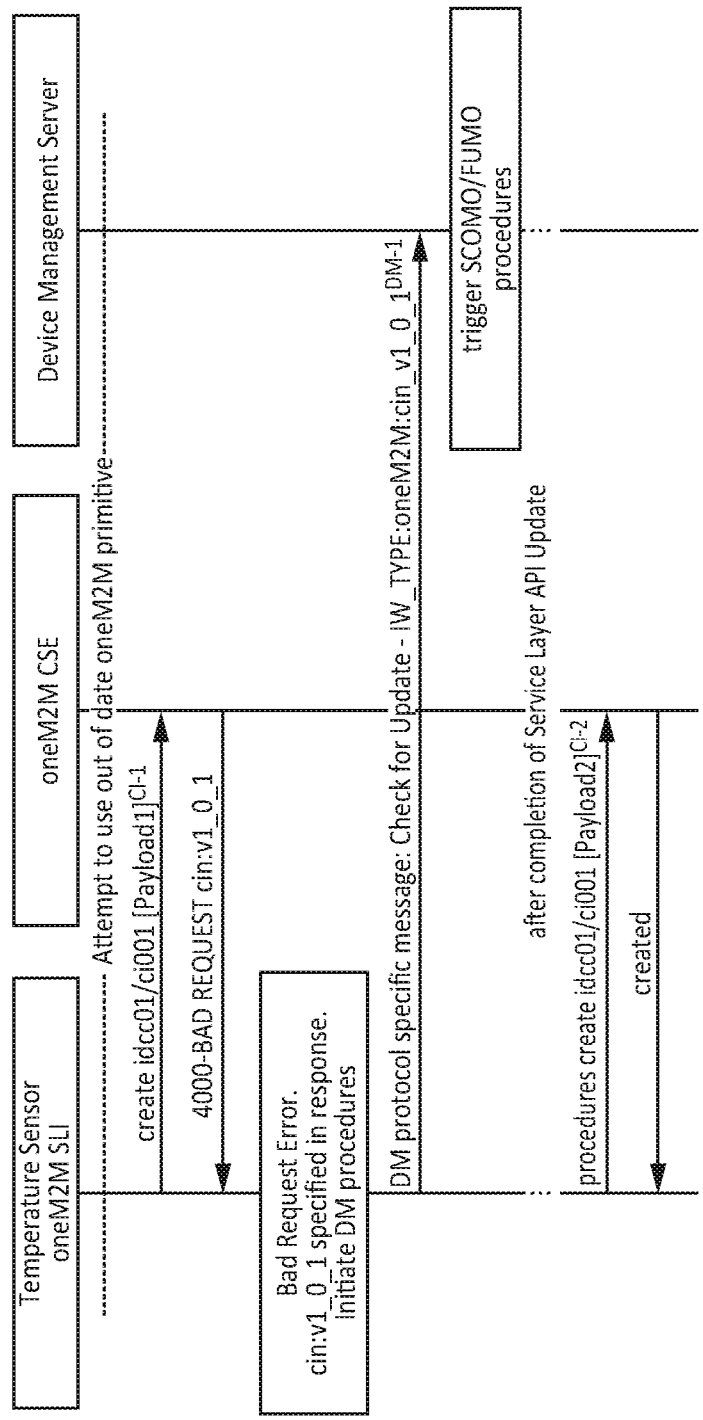
FIG. 23 is a message flow diagram of one embodiment of service layer API update procedure.

The following steps apply to FIG. 23:

In step CI-1, M2M/IoT device and/or application uses the "Send" method to connect to the service layer.

```
<?xml version="1.0" encoding="UTF-8"?>
<m2m:req xmlns:m2m="http://www.onem2m.org/xml/protocols"
xmlns:xsi="http://www.w3.org/2001/XMLSchema-instance"
xsi:schemaLocation="http://www.onem2m.org/xml/protocols CDT-requestPrimitive-v1_0_0.xsd">
    <op>1</op>
    <to>//cse1.mym2msp.org/</to>
    <fr>//cse1234/app567</fr>
    <ri>0002bf63</ri>
    <ty>4</ty>
    <pc>
        <cin rn="temp754">
            <cnf>application/xml:1</cnf>
            <con>PHRpbWU+MTc4ODkzMDk8L3RpbWU+PHRlbXA+MjA8L3RlbXA+DQo=</con>
        </cin>
    </pc>
</m2m:req>
```

Error response 4000—Bad Request, providing details of the primitive version that failed (cin:v1_0_1)

In step DM-1, DM Update Request—IW_TYPE: oneM2M; cin:v1_0_1

In step CI-2, M2M/IoT device and/or application uses the Updated "Send" method to connect to the service layer using the correct primitive formatting. The new attribute, 'xyz' is included in the Create request.

```
<?xml version="1.0" encoding="UTF-8"?>
<m2m:req xmlns:m2m="http://www.onem2m.org/xml/protocols"
xmlns:xsi="http://www.w3.org/2001/XMLSchema-instance"
xsi:schemaLocation="http://www.onem2m.org/xml/protocols CDT-requestPrimitive-v1_0_0.xsd">
    <op>1</op>
    <to>//cse1.mym2msp.org/</to>
    <fr>//cse1234/app567</fr>
    <ri>0002bf63</ri>
    <ty>4</ty>
    <pc>
        <cin rn="temp754">
            <cnf>application/xml: 1</cnf>
            <con>PHRpbWU+MTc4ODkzMDk8L3RpbWU+PHRlbXA+MjA8L3RlbXA+DQo=</con>
            <xyz>mandatory parameter</xyz>
        </cin>
    </pc>
</m2m:req>
```

Created

Figure 25A:
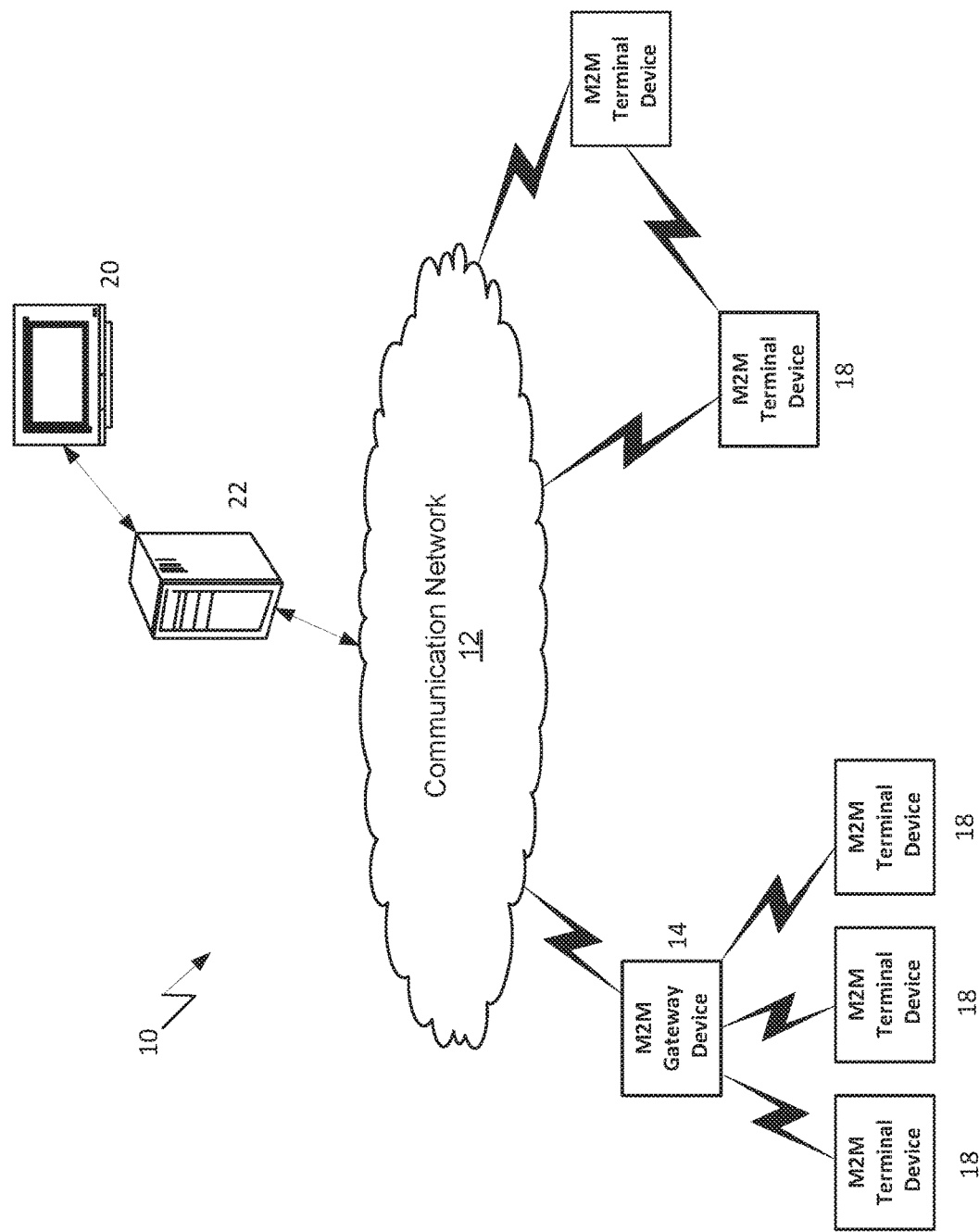
FIG. 25A is a diagram of an exemplary machine-to-machine (M2M) or Internet of Things (IoT) communication system in which one or more disclosed embodiments of IoT event management systems and methods may be implemented.
Figure 25B:
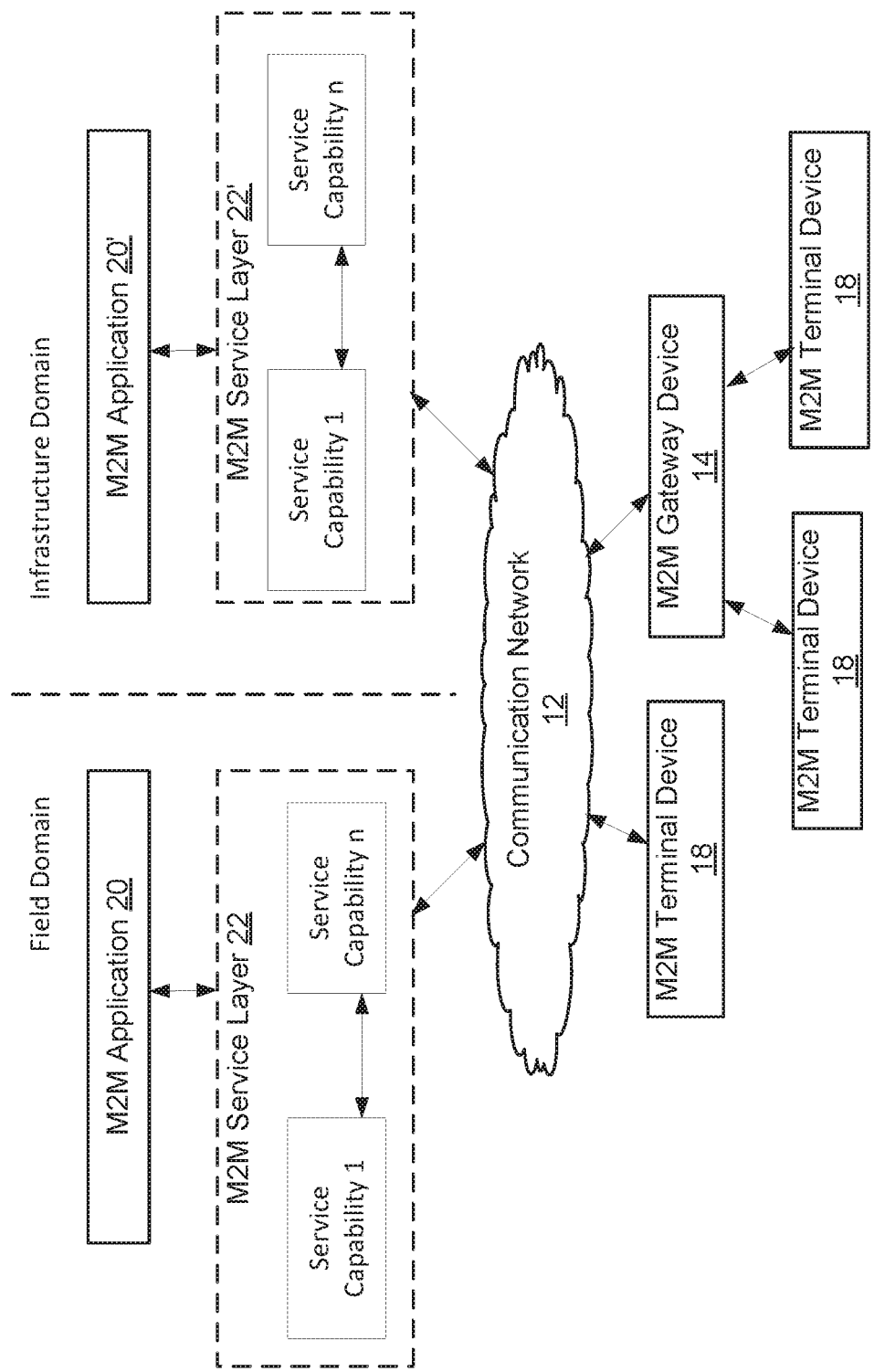
FIG. 25B is a system diagram of an exemplary architecture that may be used within the M2M/IoT communications system illustrated in FIG. 25A.
Figure 25C:
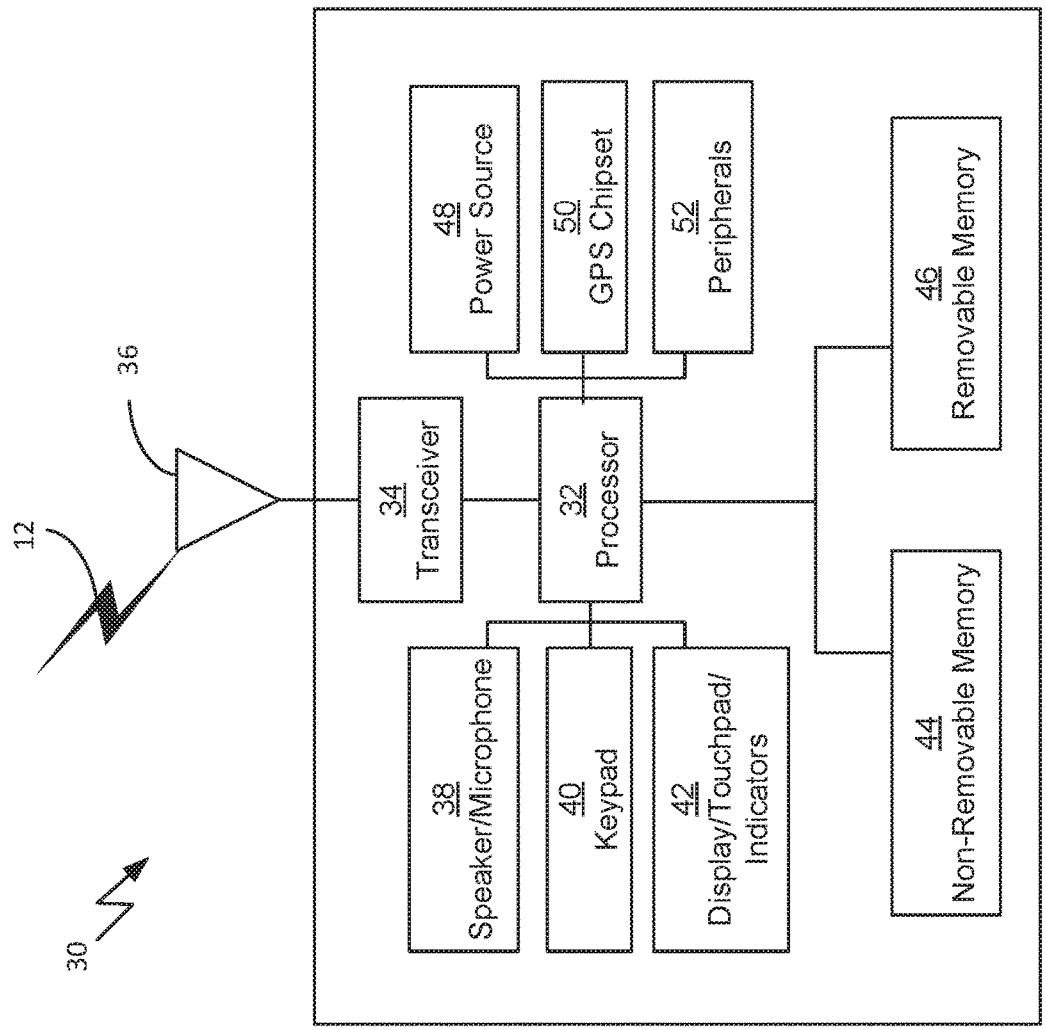
FIG. 25C is a system diagram of an exemplary M2M/IoT terminal or gateway device that may be used within the communications system illustrated in FIG. 25A.
Figure 25D:
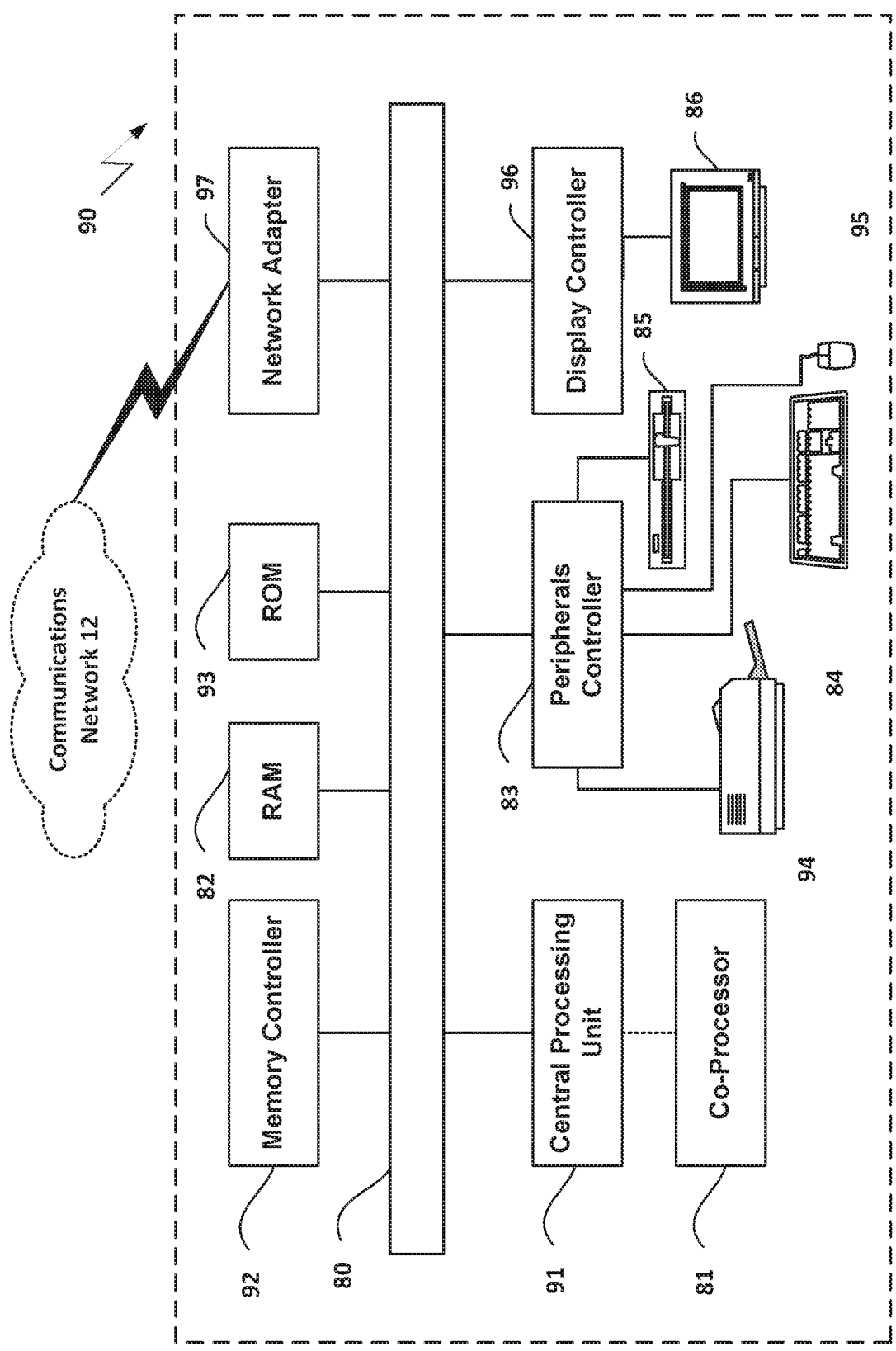
FIG. 25D is a block diagram of an exemplary computing system in which aspects of the communication system of FIG. 25A may be embodied.

It is understood that the entities performing the steps illustrated in FIGS. 14-23 are logical entities that may be implemented in the form of software (i.e., computer-executable instructions) stored in a memory of, and executing on a processor of, a network node or computer system such as those illustrated in FIG. 25C or FIG. 25D. That is, the method(s) illustrated in FIGS. 14-23 may be implemented in the form of software (i.e., computer-executable instructions) stored in a memory of a network node, such as the node or computer system illustrated in FIG. 25C or FIG. 25D, which computer executable instructions, when executed by a processor of the node, perform the steps illustrated in FIGS. 14-23. It is also understood that any transmitting and receiving steps illustrated in FIGS. 14-23 may be performed by communication circuitry of the node under control of the processor of the node and the computer-executable instructions (e.g., software) that it executes.

User Interfaces

Figure 24A:
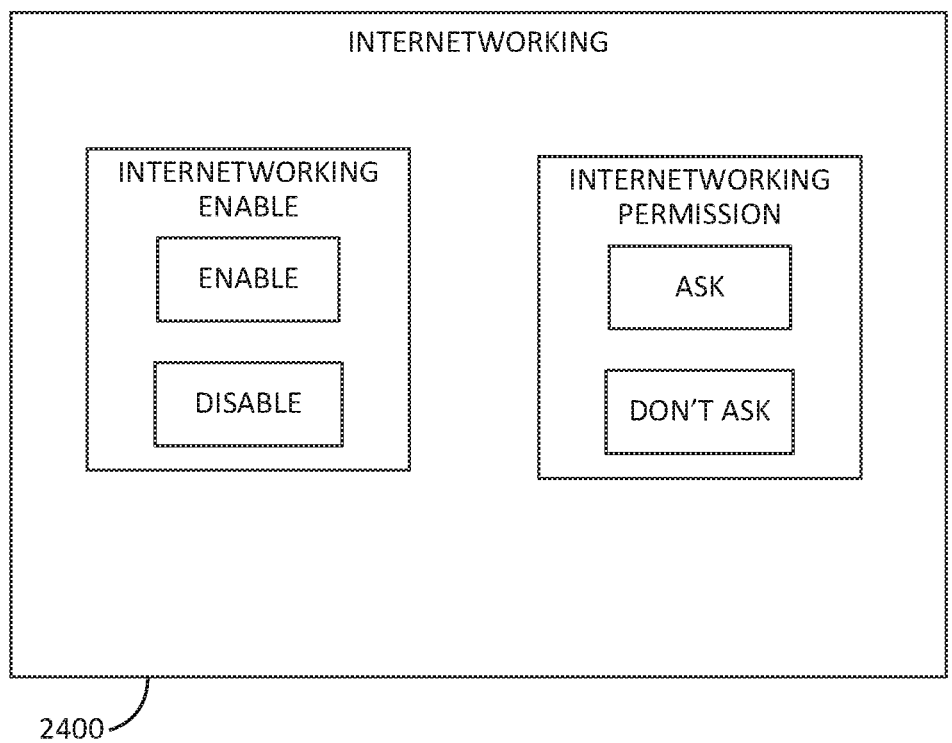
FIG. 24A-C are diagrams of an exemplary user interfaces.

Interfaces, such as Graphical User Interfaces (GUIs), can be used to assist user to control and/or configure functionalities related to interworking M2M and IOT devices and application with different service layers. In FIG. 24A, a Graphical User Interface (GUI) 2400 can allow internetworking to be enabled or disabled as well as to indicate whether to request permission before any internetworking or software updates.

Metadata about "service layer API", "service layer Detection", and "SLI Update" modules are transmitted between entities defined in this architecture. This metadata can be displayed in simple text form as in GUI 2402 of FIG. 24B, or put into an information dialog as in GUI 2404 of FIG. 24C, or be used to assist the procedures defined in the disclosure in a graphical manner.

It is to be understood that interfaces 2400, 2402 and 2404 can be produced using displays such as those shown in FIGS. 25C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The term service layerservice layer refers to a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a-service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

Figure 24B:
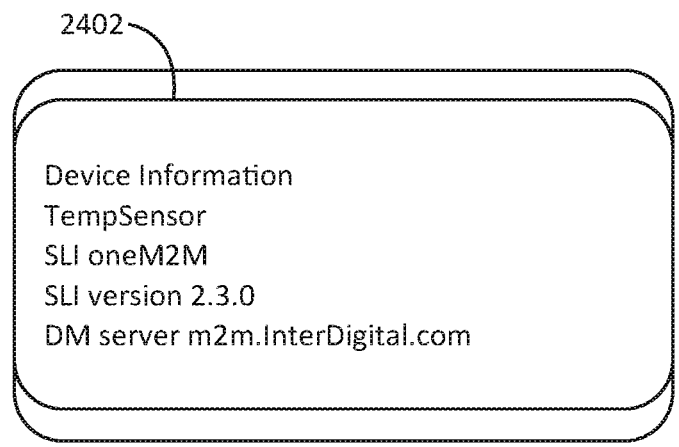
Figure 24C:
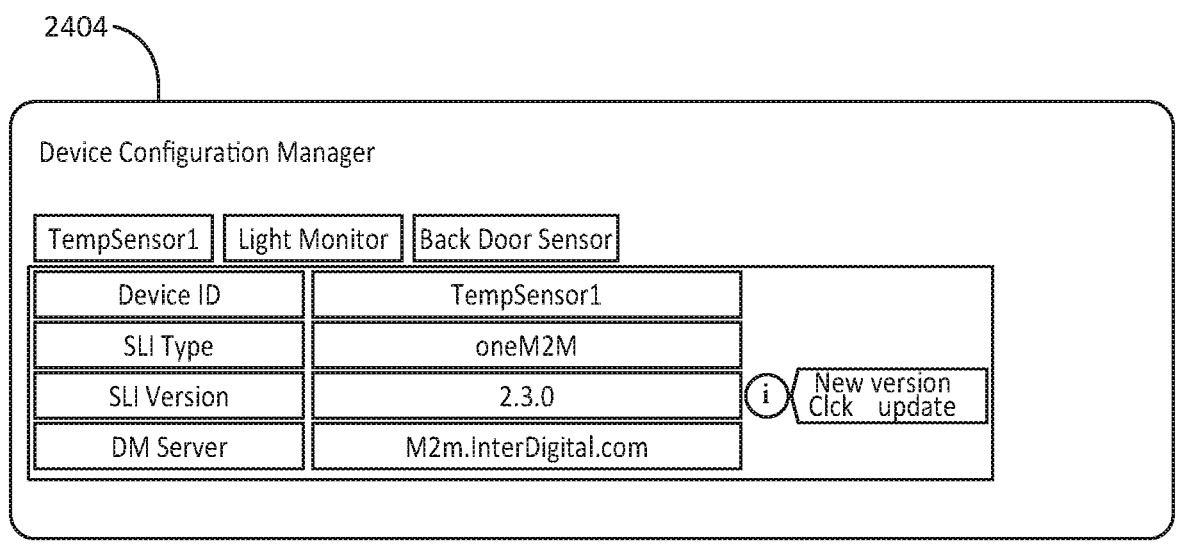

FIG. 25A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as service layer API 1304, M2M/IoT device 1301, Application/Server Logic 1302, service layer Detection 1306 SLI Update Module 1308 and M2M/IoT service layer 102 as well as logical entities to produce the user interfaces 2400, 2402 and 2404 of FIGS. 24A-C.

As shown in FIG. 25A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 25A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 25B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as service layer API 1304, M2M/IoT device 1301, Application/Server Logic 1302, service layer Detection 1306 SLI Update Module 1308 and M2M/IoT service layer 102 as well as logical entities to produce the user interfaces 2400, 2402 and 2404 of FIGS. 24A-C.

The M2M service layer 22 may be implemented by one or more servers, computers, devices, virtual machines (e.g. cloud/storage farms, etc.) or the like, including for example the devices illustrated in FIGS. 25C and 25D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 25B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as service layer API 1304, M2M/IoT device 1301, Application/Server Logic 1302, service layer Detection 1306 SLI Update Module 1308 and M2M/IoT service layer 102 as well as logical entities to produce the user interfaces 2400, 2402 and 2404 of FIGS. 24A-C may be hosted within a M2M service layer instance hosted by an M2M node, such as an M2M server, M2M gateway, or M2M device, as shown in FIG. 25B. For example, the logical entities such as service layer API 1304, M2M/IoT device 1301, Application/Server Logic 1302, service layer Detection 1306 SLI Update Module 1308 and M2M/IoT service layer 102 as well as logical entities to produce the user interfaces 2400, 2402 and 2404 of FIGS. 24A-C may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 25C or FIG. 25D described below.

Further, logical entities such as service layer API 1304, M2M/IoT device 1301, Application/Server Logic 1302, service layer Detection 1306 SLI Update Module 1308 and M2M/IoT service layer 102 as well as logical entities to produce the user interfaces 2400, 2402 and 2404 of FIGS. 24A-C can implemented as part of an M2M network that uses a Service Oriented Architecture (SOA) and/or a Resource-Oriented Architecture (ROA) to access services of the present application.

FIG. 25C is a block diagram of an example hardware/software architecture of a M2M network node 30, such as an M2M device 18, an M2M gateway 14, an M2M server, or the like. The node 30 can execute or include logical entities such as service layer API 1304, M2M/IoT device 1301, Application/Server Logic 1302, service layer Detection 1306 SLI Update Module 1308 and M2M/IoT service layer 102 as well as logical entities to produce the user interfaces 2400, 2402 and 2404 of FIGS. 24A-C. The node 30 can be part of an M2M network as shown in FIG. 25A-B or part of a non-M2M network. As shown in FIG. 25C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 25C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 25C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 25C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., figure print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

FIG. 25D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as service layer API 1304, M2M/IoT device 1301, Application/Server Logic 1302, service layer Detection 1306 SLI Update Module 1308 and M2M/IoT service layer 102 as well as logical entities to produce the user interfaces 2400, 2402 and 2404 of FIGS. 24A-C. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 25A and FIG. 25B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 25 A-B or the node 30 of FIG. 25 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as service layer API 1304, M2M/IoT device 1301, Application/Server Logic 1302, service layer Detection 1306 SLI Update Module 1308 and M2M/IoT service layer 102 as well as logical entities to produce the user interfaces 2400, 2402 and 2404 of FIGS. 24A-C may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A first apparatus comprising a processor, a memory, and communication circuitry, the first apparatus being connected to a network via the communication circuitry, the first apparatus further comprising computer-executable instructions stored in the memory which, when executed by the processor, cause the first apparatus to:
   send, to a second apparatus, a service layer registration request;
   receive, from the second apparatus, a service layer registration response, the service layer registration response indicating that no compatible service layer is available at the second apparatus; and
   send, to a third apparatus and based on the service layer registration response, the third apparatus being a device management service, an update request, the update request requesting that the third apparatus update the software of the first apparatus to be compatible with a service layer of the second apparatus.

2. The apparatus of claim 1, wherein the service layer registration response comprises a service layer type.

3. The apparatus of claim 2, wherein the instructions further cause the first apparatus to analyze the service layer registration response using service layer detection.

4. A second apparatus comprising a processor, a memory, and communication circuitry, the second apparatus being connected to a network via the communication circuitry, the second apparatus further comprising computer-executable instructions stored in the memory which, when executed by the processor, cause the second apparatus to:
   receive, from a first apparatus, a service layer registration request, the service layer registration request comprising an indication of a device manager type;
   determine, based upon the service layer registration request, whether a compatible service layer is available at the second apparatus;
   if a compatible service layer is not available at the second apparatus, send to a third apparatus, the third apparatus being a device management service, an update request, the update request comprising an indication of the device manager type indicated in the service layer registration request; and
   receive, from the third apparatus, a software update to the second apparatus's service layer to be compatible with the service layer of the first apparatus in accordance with the update request.

5. The second apparatus of claim 4, wherein the service layer registration request comprises a list of compatible service layers.

6. The second apparatus of claim 4, wherein the service layer registration request comprises a list of compatible device management devices.

7. The second apparatus of claim 4, wherein the instructions further cause the second apparatus to send, to the first apparatus, a service layer registration response, the service layer registration response indicating at least one compatible service layer.

8. A second apparatus comprising a processor, a memory, and communication circuitry, the second apparatus being connected to a network via the communication circuitry, the second apparatus further comprising computer-executable instructions stored in the memory which, when executed by the processor, cause the second apparatus to:
   receive, from a first apparatus, a service layer registration request, the service layer registration request comprising an indication of a device manager type;
   determine, based upon the service layer registration request, whether a compatible service layer is available at the second apparatus; and
   if a compatible service layer is not available at the second apparatus, send to a third apparatus, the third apparatus being a device management service, an update request, the update request requesting that the third apparatus update the service layer of the first apparatus to be compatible with the service layer of the second apparatus.

9. The apparatus of claim 8, wherein the service layer registration request comprises a list of compatible service layers.

10. The apparatus of claim 8, wherein the service layer registration request comprises a list of compatible device management devices.

11. The apparatus of claim 8, wherein the instructions further cause the second apparatus to send, to the first apparatus, a service layer registration response, the service layer registration response indicating at least one compatible service layer.

* * * * *